(12) United States Patent  
Parker

(10) Patent No.: US 8,630,828 B2  
(45) Date of Patent: Jan. 14, 2014

(54) METHODS FOR MODELING AMPLITUDE MODULATED LIGHT THROUGH DISPERSIVE OPTICAL SYSTEMS AND ELECTRONIC DISTANCE MEASUREMENT INSTRUMENTS

(71) Applicant: David H. Parker, Earlysville, VA (US)

(72) Inventor: David H. Parker, Earlysville, VA (US)

( * ) Notice: Subject to any disclaimer, the term of this patent is extended or adjusted under 35 U.S.C. 154(b) by 0 days.

(21) Appl. No.: 13/778,036

(22) Filed: Feb. 26, 2013

(65) Prior Publication Data

US 2013/0170010 A1     Jul. 4, 2013

Related U.S. Application Data

(62) Division of application No. 12/838,452, filed on Jul. 18, 2010, now Pat. No. 8,416,396.

(51) Int. Cl.
| G06F 7/60 | (2006.01) |
| G06G 7/48 | (2006.01) |
| G06G 7/56 | (2006.01) |
| G02B 26/00 | (2006.01) |
| G02F 1/01 | (2006.01) |

(52) U.S. Cl.  
USPC ............ 703/5; 703/2; 703/3; 703/6; 359/237; 359/238; 359/276

(58) Field of Classification Search  
None  
See application file for complete search history.

(56) References Cited

U.S. PATENT DOCUMENTS

| 969,785 | A | 9/1910 | Kellner |
| 3,365,717 | A | 1/1968 | Holscher |
| 3,508,828 | A | 4/1970 | Froome |
| 3,619,058 | A | 11/1971 | Hewlett |
| 3,656,853 | A | 4/1972 | Bagley |
| 4,518,854 | A | 5/1985 | Hutchin |
| 4,650,330 | A | 3/1987 | Fujita |
| 5,233,176 | A | 8/1993 | Veligdan |
| 5,440,112 | A | 8/1995 | Sakimura |
| 5,455,670 | A | 10/1995 | Payne |
| 5,764,360 | A | 6/1998 | Meier |
| 5,781,334 | A | 7/1998 | Daendliker |
| 5,784,161 | A | 7/1998 | Bechstein |
| 6,097,488 | A | 8/2000 | Grek |
| 6,222,678 | B1 | 4/2001 | Kimura |
| 6,262,834 | B1 * | 7/2001 | Nichols et al. ................ 359/301 |
| 6,333,783 | B1 | 12/2001 | Ohishi |
| 6,411,371 | B1 | 6/2002 | Hinderling |
| 6,426,834 | B1 | 7/2002 | Braunecker |
| 6,504,602 | B1 | 1/2003 | Hinderling |
| 6,646,724 | B2 | 11/2003 | Benz |
| 6,665,116 | B1 | 12/2003 | Harvey |
| 7,055,253 | B2 | 6/2006 | Kaneko |
| 7,055,957 | B2 | 6/2006 | Troyer |
| 7,081,917 | B2 | 7/2006 | Shimoyama |

(Continued)

OTHER PUBLICATIONS

Taub et al., Principles of Communications Systems, 1971, Chapter 3, McGraw Hill.

(Continued)

*Primary Examiner* — Omar Fernandez Rivas  
*Assistant Examiner* — Nithya J Moll  
(74) *Attorney, Agent, or Firm* — David H. Parker

(57) ABSTRACT

Methods are disclosed for computer modeling of amplitude modulated light in dispersive optical systems. Ray tracings are extended to include calculations of the modulated phase for the rays. Examples are given for electronic distance measurement instrument applications.

7 Claims, 14 Drawing Sheets

(56) References Cited

U.S. PATENT DOCUMENTS

| | | | |
|---|---|---|---|
| 7,088,503 B2 | 8/2006 | Harvey | |
| 7,101,053 B2 | 9/2006 | Parker | |
| 7,230,678 B2 | 6/2007 | Bruebach | |
| 7,260,251 B2 | 8/2007 | Dowski | |
| 7,268,880 B2 | 9/2007 | Hinderling | |
| 7,324,761 B2 * | 1/2008 | Schulz et al. | 398/185 |
| 7,443,495 B2 | 10/2008 | Hertzman | |
| 7,469,202 B2 | 12/2008 | Dowski | |
| 7,626,690 B2 | 12/2009 | Kumagai | |
| 7,684,023 B2 | 3/2010 | Kang | |
| 7,800,758 B1 | 9/2010 | Bridges | |
| 7,860,699 B2 * | 12/2010 | Dowski et al. | 703/13 |
| 7,924,894 B2 | 4/2011 | Livingston | |
| 8,031,331 B2 | 10/2011 | Meier | |
| 8,113,660 B1 | 2/2012 | Troyer | |
| 8,416,396 B2 * | 4/2013 | Parker | 356/3 |
| 2007/0035800 A1 * | 2/2007 | Hochberg et al. | 359/237 |
| 2009/0143874 A1 | 6/2009 | Dowski | |
| 2010/0046003 A1 | 2/2010 | Le Floch | |
| 2010/0073667 A1 | 3/2010 | Cyr | |
| 2010/0089117 A1 | 4/2010 | Liu | |
| 2010/0091266 A1 | 4/2010 | Yasuda | |

OTHER PUBLICATIONS

Horowitz et al., The Art of Electronics, 1989, sections 13.14 & 13.15, Cambridge.
Jenkins et al., Fundamedtals of Optics, 1976, chapters 1, 4, 5, 12, 23 & sections 9.14 & 10.20, McGraw Hill.
Born et al., Principles of Optics, 2002, section 6.4, Cambridge.
Melles Griot, Melles Griot Catalog X, 2005, section 1.
Levi, Applied Optics, V. 1, 1968, section 3.2, Wiley.
Goodman, Introduction to Fourier Optics, 2005, section 5.1, Roberts.
TIE-29: Refractive Index and Dispersion, 2007, Schott North America.
N-BK7 Data Sheet, 2007, Schott North America.
Smith, Modern Optical Engineering, 2008, chapter 7 & section 16.8, McGraw Hill.

* cited by examiner

METHODS FOR MODELING AMPLITUDE MODULATED LIGHT THROUGH DISPERSIVE OPTICAL SYSTEMS AND ELECTRONIC DISTANCE MEASUREMENT INSTRUMENTS

1. CROSS-REFERENCE TO RELATED APPLICATIONS

This application is a divisional of, and claims priority to, U.S. application Ser. No. 12/838,452; Methods and apparatus for optical amplitude modulated wavefront shaping, filed Jul. 18, 2010, now U.S. Pat. No. 8,416,396, which is incorporated by reference herein.

2. FIELD OF THE INVENTION

This invention is related to the design, analysis, and construction of optical components and systems for radio frequency (RF), or higher frequency, temporally modulated optical wavefronts, and in particular, wavefronts in optical time-of-flight or phase measurement instruments using dispersive optical elements in the optical train. Elements from communications theory, including amplitude modulation (AM) and analysis in the Fourier transform frequency domain are unified with classical optics in order to correct for wavefront distortion of a modulation envelope at the beat note frequency produced by two optical carrier sidebands, or a group of optical sidebands, in order to optimize measurement, of pulse, chirp, phase, or the like systems wherein the measurement is integrated over an area of the wavefront at a detector, and demodulated at the modulation frequency, or heterodyned to an intermediate frequency (IF).

3. BACKGROUND OF THE INVENTION

3.1 Amplitude Modulation

RF temporal modulation techniques for communications applications are well known in the art. For example, *Principles of Communication Systems*, Taub and Schilling [1] is one of many standard electrical engineering textbooks which include sections on amplitude modulation. Chapter 3, "Amplitude-modulation Systems", the disclosure of which is incorporated by reference herein, provides a good refresher on the theoretical principles and nomenclature used in AM communications. The terms modulating, mixing, heterodyning, baseband, carrier, upper sideband, lower sideband, demodulation, recover, detection, single-sideband, double-sideband, suppressed-carrier, narrow-band, square-law detector, and others are well known in the art as described therein, and will be assumed to be defined accordingly, unless expressely noted otherwise.

*The Art of Electronics*, Horowitz and Hill [2] is another standard reference which describes amplitude modulation radio in sections 13.14 and 13.15, the disclosure of both of which are incorporated by reference herein.

3.2 Classical Optics

Optical system design techniques for conventional quasi-time-invariant imaging and non-imaging applications are well known in the art. The technical literature has a rich heritage of rules of thumb, first order approximations, technical nomenclature, and fabrication techniques. Standard references include: *Fundamentals of Optics*, Jenkins and White [3]; *Principles of Optics*, Born and Wolf [4]; and many others.

With modern computers, and measuring and testing instrumentation, it is now common to correct for higher order time-invariant aberrations and to optimize designs involving many degrees of freedom, including choices of materials, optical element geometry, and systems architectures.

For example, there are a number of excellent computer modeling tools available for analysis and engineering of optical elements and systems, such as: ZEMAX, available from Zemax Development Corp.; CODE-V, available from Optical Research Associates; Optica 3, a Mathematica package available from Wolfram Research, Inc.; and others. U.S. Pat. No. 7,469,202 and US 2009/0143874 to Dowski et al., the disclosure of both of which are incorporated by reference herein, disclose a method for optimizing both optical and digital systems in combination.

Some of these tools do use analysis of modulation in the spatial domain, such as the modulation transfer function (MTF), to model such things as the capability of an optical system to resolve line pairs. However, none of these tools are designed to work with RF or higher temporally modulated wavefronts, i.e., they are designed for time-invariant applications.

3.3 Optical Amplitude Modulation

Hereinafter the term "optical amplitude modulation" (OAM) will be understood to mean modulation of the amplitude, power, phase, polarization, frequency, etc. of electromagnetic radiation, modulated at RF, microwave (MW), or terahertz (THz) frequencies in the time domain, so as to produce optical sideband frequencies that propagate at different velocities in a dispersive medium. As will be shown hereinbelow, OAM can include a carrier, but the term will also be understood to apply to suppressed carrier architectures that produce beat notes, e.g., as by interference between two tuned lasers, which act as sidebands.

Such things as spatial amplitude modulation of images by line pairs, and low frequency temporal modulation by such things as chopper wheels, and lock-in amplifiers will be specifically noted, so as not to be confused with the default use of the term OAM, hereinbelow.

3.4 Optical Test Methods

Optical test methods are well known in the art for imaging optical components. For example, *Optical Shop Testing*, Daniel Malacara [5] is a comprehensive reference on the subject, including such topics as interferometry, Ronchi patterns, Moiré, etc. Low frequency phase modulation, or discrete steps in phase, is used in interferometry and Moiré, however these techniques are quasi-time-invariant and do not fit the criteria for OAM as defined hereinabove.

There are no known standard testing methods for optical components as to OAM under the definition hereinabove. Moreover, there are no known standard commercial catalog terms, nomenclature, or specifications to even describe OAM parameters of passive optical components.

3.5 Aberrations

Classical time-invariant lens aberrations are well known in the art. Standard references include: Jenkins and White [3], Born and Wolf [4], and others. A good handbook covering aberrations and general optics is chapter 1, "Fundamental Optics", in the Melles Griot Catalog X [6], the disclosure of which is incorporated by reference herein.

Section 3 of the Melles Griot Catalog X explains wavefront distortion, including how it is defined for product specifications. The first two paragraphs state;

> Sometimes the best specification for an optical component is its effect on the emerging wavefront. This is particularly true for optical flats, collimation lenses, mirrors, and retroreflectors where the presumed effect of the element is to transmit or reflect the wavefront without changing its shape. Wavefront distortion is often characterized by the peak-to-valley deformation of the emergent wavefront from its intended shape. Specifications are normally quoted in fractions of a wavelength.
>
> Consider a perfectly plane, monochromatic wavefront, incident at an angle normal to the face of a window. Deviation from perfect surface flatness, as well as inhomogeneity of the bulk material refractive index of the window, will cause a deformation of the transmitted wavefront away from the ideal plane wave. In a retroreflector, each of the faces plus the material will affect the emergent wavefront. Consequently, any reflecting or refracting element can be characterized by the distortions imparted to a perfect incident wavefront.

It will be shown that the notion of wavefront distortion needs to be extended to distortions of a beat note produced by an ideal modulated wave, and the specification needs to be included in engineering data for an optical product.

3.6 Frequency Domain

The use of the Fourier transform in the spatial domain is well known in the optics art for such things as the modulation transfer function (MTF), point spread function (PSF), and optical transfer function (OTF). See *Applied Optics*, Levi [7] section 3.2, "Spread and Transfer Functions", the disclosure of which is incorporated by reference herein. *Introduction to Fourier Optics*, Goodman [8]; is a standard reference which will be referred to in some examples. *Linear Systems, Fourier Transforms, and Optics*, Gaskill [9] is another.

The Fourier transform in the time domain is well known in the electrical engineering art. For example, *The Fourier Transform and Its Applications*, Ronald N. Bracewell [10] is a standard reference used by electrical engineers. Electrical engineers are also well versed in the use of the Laplace transform, which is closely related to the Fourier transform. The Laplace transform is well suited to electrical engineering problems as illustrated in *Network Analysis*, M. E. Van Valkenburg [11].

However, there are no known uses of the Fourier or Laplace transforms in the literature which transform from the time domain to the frequency domain for imaging optical system design, and OAM in particular. While the analysis presented hereinbelow can be developed using either the Fourier or Laplace transforms, the Fourier transform is more familiar to those skilled in the art of optics, and electrical engineers are well versed in both, so the Fourier transform will be used for convenience.

3.7 Communications Theory

It will be recognized that optics and communications share much in common. Levi [7], devotes Chapter 3 to, "Communications Theory Aspects of Optical Images". In the opening paragraph, published in 1968, Levi states;

> It seems safe to say that systems using optical images are usually concerned with communications: the transfer or acquisition of information. We do not refer here primarily to communication by modulated light beams but rather to spatially modulated light: "the picture worth a thousand words."

The first paragraph of the Introduction to Goodman's book, first published in 1968, states;

> Since the late 1930s, the venerable branch of physics known as optics has gradually developed ever-closer ties with the communication and information sciences of electrical engineering. The trend is understandable, for both communication systems and imaging systems are designed to collect or convey information. In the former case, the information is generally of a temporal nature (e.g., a modulated voltage or current waveform), while in the latter case it is of a spatial nature (e.g., a light amplitude or intensity distribution over space), but from an abstract point of view, this difference is a rather superficial one.

Chapter 10 of Goodman [8] is titled, "Fourier Optics in Optical Communications". This chapter was added in the 2005 edition of the book. However, the subject matter is drawn to fiber optics and does not address the subject of the invention disclosed herein. It describes the effects of dispersion in the classical terms of group velocity.

*Systems and Transforms with Applications in Optics*, Papoulis [12] begins the preface, which was also published in 1968, with the following observation;

> In recent years, a trend has been developing toward greater interaction between electrical engineering and optics. This is not only because optical devices are used extensively in signal processing, storage, pattern recognition, and other areas, but also because the underlying theory is closely related to the theory of systems, transforms, and stochastic processes. In fact, whereas in system analysis the Fourier integral is an auxiliary concept, in diffraction theory it represents a physical quantity; whereas only a limited class of electrical signals need to be treated as stochastic processes, optical waves are inherently random. The following list illustrates the striking parallels between these two disciplines.
>
> Fresnel diffraction: output of a filter with quadratic phase
> Fraunhofer field: Fourier transform
> Lens: linear FM generator
> Focal plane field: Fourier transform
> Contrast improvement: filtering
> Apodization: pulse shaping
> Coherence: autocorrelation
> Michelson interferometer: correlometer consisting of a delay line and an adder
> Fabry-Perot interferometer: narrow-band filter All three authors actually teach away from the utility of working with optical systems in the time domain. Moreover—over 40 years later—there are no known software tools or standard references that rigorously treat temporally modulated light, or OAM, in combination with imaging optics design and analysis, which this invention addresses. It will be shown that another parallel can be added to Papoulis' observations;

> Dispersion: communications theory

One possible reason for this omission from the literature is that OAM systems are somewhat esoteric and heretofore religated primarily to time-of-flight instrumentation. Another reason is that electro-optical system designs naturally break between the classical optics, and electronics systems disciplines; i.e., the optical engineer takes the optical design to the detector, and the electronics engineer picks it up from the detector. Subtle effects in the optics due to the modulation, such as dispersion, can easily be missed. This invention teaches the effects of OAM and offers suggestions for minimizing negative effects.

3.8 Types of Detectors

Most electro-optical systems are designed for imaging, signal collection, spectroscopy, condensing, projection, etc.

If an optical signal is temporally modulated, it is usually low frequency—such as chopping to lock-in on an optical signal; or slowly incremented in spatial phase to do phase shift detection, as described in chapter 13 of *Optical Shop Testing* [5]. Historically, the output of an imaging optical system was a human viewer, film, photoresist, or the like. Nowadays, focal plane arrays, such as CCD and CMOS cameras, are probably the most common sensor at the output end of an optical system. In all of these cases, the output is typically integrated over a period of time, to improve the signal-to-noise ratio, remove 120 Hz flicker of artificial lighting, etc. Since the signal is integrated over time, any higher frequency temporal modulation is removed by low pass filtering of the detector integration period. For systems designed for spectroscopy, temporal modulation is typically not a concern. Optical systems such as these can be designed using classical techniques.

Optical systems designed for signal collection, can use fast single channel detectors which are capable of detecting RF, MW, or THz temporal modulation. In most of these systems, applications such as fiber optics, radar, radio astronomy, satellite dishes, microwave communications, etc., the optical path is fixed, or the entrance pupil is flooded and thus the detector sees a fixed spatial configuration with some variation in the power or phase of the signal communicating information.

It will be shown that optical systems employing curved reflecting surfaces (catoptric systems), such as radio telescopes, optical telescopes, radar systems, etc. do not use dispersive elements, and thus are much simpler to design than refracting (dioptric systems) or combined reflecting and refracting (catadioptric systems) designs. This is explained in some detail in U.S. Pat. No. 6,426,834 to Braunecker et al., the disclosure of which is incorporated by reference herein. Optical systems such as these may benefit from the disclosed invention, but classical techniques may also be sufficient.

3.9 Electronic Distance Measurement

There is a small, but significant, field of applications which combine optical systems with fast analog detectors, which are a true hybrid of imaging and communications—which this invention addresses. Electronic Distance Measurement, also called Electromagnetic Distance Measurement (EDM); and absolute distance measurement (to differentiate it from laser interferometry), also called absolute distance meters (ADM); began development in the mid 1960s. The patent literature is rich with inventions in EDM. U.S. Pat. No. 3,365,717 to Holscher; U.S. Pat. No. 3,508,828 to Froome et al.; and U.S. Pat. No. 3,619,058 to Hewlett et al., the disclosure of all three of which are incorporated by reference herein, were among the early US patents in the field.

EDM presents unique optical challenges, which will be explained in detail. *Electromagnetic Distance Measurement*, Burnside [13], is a good introduction to the fundamentals. *Selected Papers on Laser Distance Measurements*, Bosch and Lescure [14] is a good collection of the non-patent literature. *Electronic Distance Measurement*, Rüeger [15], presents the theory of operation of many EDM instruments.

In the opening paragraph, Rüeger states:

Historically, the development of electro-optical distance meters evolved from techniques used for the determination of the velocity of light. Fizeau determined the velocity of light in 1849 with his famous cogwheel modulator on a line of 17.2 km length: Light passed through the rotating cogwheel, traveled to a mirror at the end of the line, was reflected and returned to the wheel where the return light was blocked off by the teeth at high revolutions of the wheel. Fizeau's experiment employed for the first time the principle of distance measurement with modulated light at high frequencies.

For details of Fizeau's experiment, see Chapter 1 of Jenkins and White[3], the disclosure of which is incorporated by reference herein.

Commercially available EDM instruments are typically combined with two angle measurements, as with a theodolite, and used in high precision surveying instruments such as surveying total stations, also known as tacheometers; laser trackers; laser scanners; and the like. These instruments are available from companies such as Leica Geosystems, FARO Technologies, Topcon, Sokkia, Trimble, Pentax, API, and others. EDMs are also available in consumer priced, lower precision, distance only instruments available in the hardware store. While the prior art deals with the bulk effects of dispersion in the atmosphere, to correct the speed of light for temperature, humidity, and pressure; no known prior art deals with dispersion within the instrument optical design, or inhomogeneities of the wavefront across the plane of the beam, due to dispersion of the optical elements, in particular.

One EDM design is disclosed in U.S. Pat. No. 5,455,670 ('670) to Payne et al., the disclosure of which is incorporated by reference herein. In '670, a laser is modulated at 1500.000 MHz and the reflected laser beam phase is detected by a PIN detector. The detected signal is mixed with a coherently generated local oscillator at 1500.001 MHz to produce a 1 kHz IF, which is related to the phase of the 1500 MHz modulation signal, and the distance to a reflective target. Many other architectures, including polarization modulation, pulsed, and chirped systems, are in use and are well known in the art. Most EDMs use hollow retroreflectors or solid glass corner cubes for the target to be measured, as is well known in the art. U.S. Pat. No. 7,101,053 to Parker, the disclosure of which is incorporated by reference herein, provides a good survey of the topic.

In the development of the '670 invention, the Model PSH97, it was observed that the apparent distance, or phase of the detected beat note signal, was slightly dependent on the size of the return beam. For example, if an iris was placed at the objective lens, the measured distance changed slightly as the iris was opened or closed. It was also observed that the apparent distance was slightly dependent on which part of the expanded beam was retroreflected back to the instrument. For example, the apparent distance was found to be slightly dependent on the pointing of the beam, i.e., if the beam was not centered on the retroreflector, the distance changed with the pointing. This was also observed in experiments with a Topcon total station. The source of the error was not determined in the course of the development of the instruments for the National Radio Astronomy Observatory (NRAO), Robert C. Byrd Green Bank Telescope (GBT) project. Subsequent thought and investigation as to the source of the error gives rise to the instant invention.

3.10 Other Preferred Embodiments

While modulation of light at microwave frequencies is well known in the art, rapid advances have been made in the generation of terahertz (THz) waves, which span the spectrum between microwaves and infrared radiation. For example, U.S. Pat. No. 7,684,023 to Kang et al., discloses Apparatus and method for generating THz wave by heterodyning optical and electrical waves. It will be recognized that the invention will have application for these wavelengths also.

While radio telescopes employ catoptric main reflectors, many receivers employ dielectric lenses to correct for aberrations of the main reflector, subreflector, or other optical elements, and thus temporally modulated signals, such as pulsars (rotating neutron stars that emit light pulses at frequencies up to ≈1 kHz) may be subject to additional dispersion due to the optics. This could also be a source of error for very long baseline interferometry (VLBI) as explained in *Interferometry and Synthesis in Radio Astronomy*, Thompson, Moran, and Swenson [16].

While the invention will be illustrated by preferred embodiments and figures related to EDM, the invention is only limited by the claims, and other embodiments employing the spirit of the invention will be recognized by those skilled in the art. For example, the same principles may be applied to instruments designed as refractometers to measure index of refraction of materials, chemical composition, temperature, humidity, pressure, atmospheric turbulence refractivity structure constant $C_n^2$, mechanical vibrations, or the like.

4 BRIEF SUMMARY OF THE INVENTION

The specification discloses a theoretical foundation explaining the effects of dispersion as it relates to optical systems—and electronic distance measurement in particular.

In one embodiment of the invention, a method provides steps for analyzing an optical system at the optical frequency, and for modeling a much lower frequency beat note wavefront produced by optical amplitude modulation.

In another embodiment of the invention, an achromatic lens provides for wavefront shaping of a beat note wavefront.

In yet another embodiment of the invention, an optical apparatus provides aberration corrections for the beat note wavefront.

The need for engineering data related to optical amplitude modulation is presented.

5 BRIEF DESCRIPTION OF THE DRAWINGS

6 DETAILED DESCRIPTION OF THE INVENTION

Figure 1:
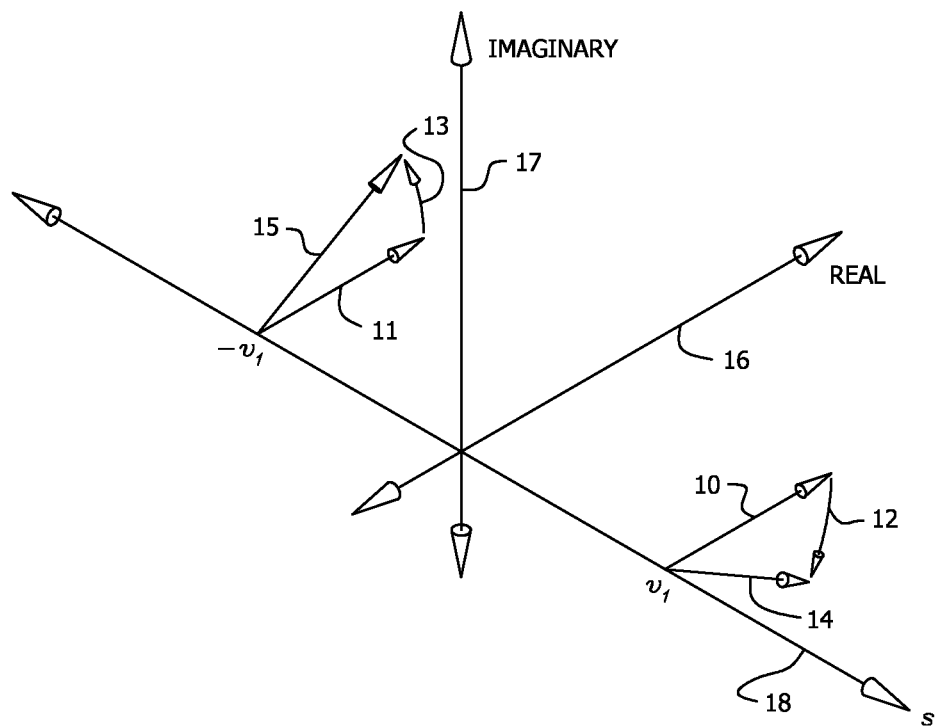
FIG. 1 is a diagram illustrating the effect of a phase shift in the frequency domain.

For a complete understanding of the invention, and in order to develop a better understanding of the physics involved in an OAM wave traveling through a dispersive medium, a derivation from first principles, heretofore unknown in the literature, will be developed from a combination of classical optics and communications theory perspective.

Most optics books, and even introductory level physics books covering sound and quantum mechanics, give a brief explanation of the superposition, or interference, of waves. The underlying information in a superposition of waves is commonly described as the beat note, envelope, packet, or group, as is well known in the art. For example, chapter 12 of Jenkins and White [3], the disclosure of which is incorporated by reference herein, gives an example of the superposition of waves of slightly different frequencies and derives the group velocity of a wave packet. Equation 12p of Jenkins and White derives the group velocity u as $$u = v - \lambda \frac{dv}{d\lambda} \quad (1)$$

where v is the wave velocity and λ is the wavelength.

The derivation herein will be somewhat more tedious, but will provide a better understanding of the mechanisms. The velocity of the envelope of two superpositioned waves, or the beat note, traveling in a dispersive medium is slowed down, or retarded in time, in most cases. As will be shown hereinbelow, there are resonances wherein the dispersion $$\frac{dv}{d\lambda}$$

can be zero or negative. The connection between equation 1 and the design of optical systems for EDM needs to be developed in more detail in order to understand the subtleties.

As Rüeger [15] points out, EDM can also be thought of as a measurement of time delay. It will be shown that the apparent time delay produced by dispersion produces a delay which must be corrected in order to measure distance by EDM. It will also be shown that the time delay may depend on such things as the path of a ray through the optical system, and thus the delay may not be homogeneous across a beam, or a constant under all conditions.

This is a salient feature of the disclosure which will be emphasized.

For example, as will be shown hereinbelow, the delay of an OAM signal for a ray through the center of a lens is not the same as the delay for a ray through the edge of the lens. An OAM point source at the focal point of a convex lens designed for a carrier wavelength will produce a plane wave with a flat wavefront for the carrier wave, but the modulated wave produced by the superposition of two sidebands to the carrier, as produced by amplitude modulation, will be distorted. This can be visualized from Fermat's principle, which is explained in section 1.9 of Jenkins and White [3], and in more detail hereinbelow.

It will be shown that in general, optical systems have a heretofore unrecognized aberration within the instrument due to differential phase delays of the sidebands of a modulated signal across a wavefront.

6.1 A Traveling Wave in the Time Domain

Turning now to first principles to better illustrate the invention. A traveling wave $\psi(x,t)$ is most often described as $$\psi(x,t)=\cos(\omega t - kx - \phi) \tag{2}$$

where x is distance, t is time, $\omega$ is the angular frequency, k is the wave number, and $\phi$ is a phase constant. The wave number k is $$k = \frac{2\pi}{\lambda} \tag{3}$$

where $\lambda$ is the wavelength. The wavelength $\lambda$ is $$\lambda = \frac{\upsilon}{\nu} \tag{4}$$

where $\upsilon$ is the velocity, $\nu$ is the frequency, and $\nu=\omega/(2\pi)$. The wave number k can be written $$k = \frac{2\pi\nu}{\upsilon}. \tag{5}$$

For light, $$\upsilon = c/n \tag{6}$$

where c is the speed of light, and n is the index of refraction. The traveling wave $\psi(x,t)$ in equation 2 can be written for a light wave of frequency $\nu$ traveling in a medium with index of refraction n as $$\psi(x,t) = \cos\left(2\pi\nu t - \frac{2\pi n\nu}{c}x - \phi\right). \tag{7}$$

In general, a cos function shifted by a phase angle $\beta$ can be written as a combination of cos and sin functions, e.g., $$\cos(\alpha-\beta)=\cos(\alpha)\cos(\beta)+\sin(\alpha)\sin(\beta). \tag{8}$$

For example, if $\alpha$ is a function of time t, such as $2\pi\nu t$ and $\beta$ is a function of x, such as kx $$\cos(2\pi\nu t - kx) = \cos(kx)\cos(2\pi\nu t) + \sin(kx)\sin(2\pi\nu t) \tag{9}$$

or two oscillating sinusoidal waves of frequency $\nu$ that each vary in amplitude as a function of position x. This is cumbersome to visualize in general, and as will be shown later becomes even more cumbersome when dealing with products of sinusoidal waves. Fortunately the analysis is much easier using mathematical tools already developed for electrical engineering and mathematical physics.

6.2 Fourier Transform Refresher

The Fourier, Laplace, and related transforms are well known in the art, and there are many standard textbooks on the subject. As noted hereinabove, the analysis can be conducted using either transform. For convenience, the more common Fourier transform will be used to illustrate the invention. Notation can vary between authors, so the reader is directed to *The Fourier Transform and Its Applications*, Ronald N. Bracewell [10], as the reference which will be used herein.

Some background in Fourier analysis is assumed, but a brief refresher on basic notation and theorems follows. The Fourier transform operator $\mathcal{F}$ operates on a function $f(t)$ to produce the Fourier transform F(s)

$$\mathcal{F} f(t) = F(s) \tag{10}$$

and the inverse operator $\mathcal{F}^{-1}$ operates on F(s) to produce $f(t)$ $$\mathcal{F}^{-1} F(s) = f(t) \tag{11}$$

where $$F(s) = \int_{-\infty}^{\infty} f(t) e^{-i2\pi ts} dt \tag{12}$$

and $$f(t) = \int_{-\infty}^{\infty} F(s) e^{i2\pi ts} ds. \tag{13}$$

There are several theorems that will be useful for the Fourier analysis hereinbelow.

6.2.1 Similarity Theorem

If $f(t)$ has the Fourier transform F(s), then $f(at)$ has the Fourier transform $|a|^{-1} F(s/a)$.

6.2.2 Shift Theorem

If $f(t)$ has the Fourier transform F(s), then $f(t-a)$ has the Fourier transform $e^{-i2\pi as}$ F(s). It will be recognized that $e^{i\theta}$ is described by Euler's equation, and $$e^{i\theta} = \cos(\theta) + i\sin(\theta) \tag{14}$$

$$e^{-i\theta} = \cos(\theta) - i\sin(\theta) \tag{15}$$

$$e^{i\theta} e^{i\phi} = e^{i(\theta+\phi)} \tag{16}$$

and $$|e^{i\theta}| = 1 \tag{17}$$

Figure 6:
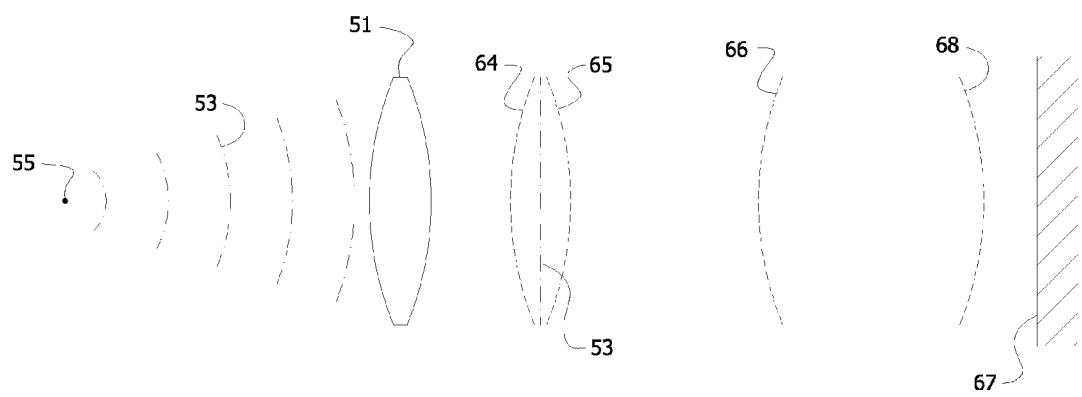
FIG. 6 is a diagram illustrating the differential phase shift of the upper and lower sidebands through a dispersive lens.

This is illustrated graphically by Bracewell [10] for a cosinusoid in FIG. 6.7 of his book. A function $f(t)=\cos(2\pi\nu t)$ has a Fourier transform with real $\delta$ functions at $s=\nu$ and $s=-\nu$. The $\delta$ function will be discussed in detail hereinbelow. If $f(t)$ is shifted by $\in$, i.e., $f(t)=\cos(2\pi\nu t-\in)$, or $\cos(2\pi\nu\{t-\in/(2\pi\nu)\})$ the $\delta$ functions in the Fourier domain are rotated by a phase angle $e^{-i\in s/\nu}$. Note that for $s=\nu$, this rotates the $\delta$ function in the negative, or clockwise, direction by $e^{-i\in}$; and for $s=-\nu$, this rotates the delta function in the positive, or counter clockwise, direction by $e^{i\in}$. In general, the $\delta$ functions become complex quantities with both real and imaginary components.

For $\in=\pi/2$, i.e., a shift of a quarter of the period, the rotation for $s=\nu$ is $e^{-i\pi/2}$ and the shift for $s=-\nu$ is $e^{i\pi/2}$. Notice that the $\delta$ function at $\nu$ becomes purely imaginary and negative, and the $\delta$ function at $-\nu$ becomes purely imaginary and positive. Notice that a phase delay of $\in=\pi/2$ for a cos is simply the sin function. The difference between the Fourier transform of a cos and a sin is simply the rotation of the $\delta$ functions, and in general all sinusoidal functions of frequency $\nu$ will have Fourier transforms of $\delta$ functions at $s=\pm\nu$, with conjugate complex components.

6.2.3 Modulation Theorem

If $f(t)$ has the Fourier transform F(s), then $f(t) \cos(2\pi\nu t)$ has the Fourier transform $$\mathcal{F}\{f(t)\cos(2\pi\nu t)\} = \frac{1}{2}F(s-\nu) + \frac{1}{2}F(s+\nu) \tag{18}$$

The result of multiplying a function $f(t)$ by $\cos(2\pi\nu t)$ in the time domain is to replicate the Fourier transform into two sidebands centered on $s=\nu$ and $s=-\nu$ in the transform domain. This is illustrated by Bracewell [10] in FIG. 6.8 of his book. This property of modulation is well known by those skilled in the art of amplitude modulation in fields such as AM radio and television. It is also well known in the field of optical fiber communications. However, it is not covered in the optical imaging literature which typically deals with quasi-temporally-invariant imaging systems such as cameras, telescopes, illumination, spectroscopy, microscopy, color, etc.

6.2.4 Convolution Theorem

It can be shown that the Fourier transform of the product of two functions in the time domain is the convolution of the Fourier transforms in the Fourier domain. If $$\mathcal{F} f(t) = F(s) \quad (19)$$

and $$\mathcal{F} g(t) = G(s) \quad (20)$$

then $$\mathcal{F} f(t)g(t) = H(s) \quad (21)$$

where $$H(s) = F(s)*G(s) \quad (22)$$

where the convolution operator * is defined $$F(s)*G(s) \equiv \int_{-\infty}^{\infty} F(\tau)G(s-\tau)d\tau. \quad (23)$$

It can be shown that convolution is commutative $$f*g = g*f \quad (24)$$

associative $$f*(g*h) = (f*g)*f \quad (25)$$

and distributive $$f*(g+h) = (f*g) + f*h. \quad (26)$$

Bracewell points out that the modulation theorem is a special case of convolution of $F(s)$ with $\mathcal{F}\{\cos(2\pi vt)\}$. This will prove to be a useful concept in the analysis that follows hereinbelow.

6.2.5 Sinusoidal Modulation of a Sinusoidal Carrier Wave

Going back to the modulation theorem and equation 18

$$\mathcal{F}\{f(t)\cos(2\pi vt)\} = \tfrac{1}{2}F(s-v) + \tfrac{1}{2}F(s+v). \quad (27)$$

If $f(t)$ is a sinusoidal carrier of a first frequency $v_1$ and the modulation is a second frequency $v_2$, the equation in the time domain is $$\cos(2\pi v_1 t)\cos(2\pi v_2 t). \quad (28)$$

Using the convolution theorem $$\mathcal{F}\{\cos(2\pi v_1 t)\cos(2\pi v_2 t)\} = \tfrac{1}{4}\{\delta(s-v_1) + \delta(s+v_1)\}*\{\delta(s-v_2) + \delta(s+v_2)\} \quad (29)$$

where $\delta(s-v_1)$ is the impulse, or Dirac delta, function as described by Bracewell in Chapter 5.

The $\delta$ function has several interesting properties, i.e., $$\delta(s) = 0 \text{ for } s \neq 0 \quad (30)$$

and $$\int_{-\infty}^{\infty} \delta(s) ds = 1 \quad (31)$$

Bracewell also describes the sifting property of the $\delta$ function in Chapter 5, which will not be repeated herein. An important property is that $$\int_{-\infty}^{\infty} \delta(s-a)f(s)ds = f(a) \quad (32)$$

which can be used to greatly simplify the convolution of $\delta$ functions. It can be shown that $$\{\delta(s-v_1)+\delta(s+v_1)\}*\{\delta(s-v_2)+\delta(s+v_2)\} = \delta(s-(v_1-v_2)) + \delta(s-(v_1+v_2)) + \delta(s+(v_1-v_2)) + \delta(s+(v_1+v_2)) \quad (33)$$

i.e., modulation in the time domain produces $\delta$ functions at $s = v_1 - v_2$; $s = v_1 + v_2$; $s = -(v_1 - v_2)$; and $s = -(v_1 + v_2)$.

6.2.6 Traveling Wave in the Fourier Domain

Returning to the traveling wave, in equation 7

$$\psi(x,t) = \cos\left(2\pi vt - \frac{2\pi nv}{c}x - \phi\right) \quad (34)$$

can be cast in the form to apply the shift theorem $$\psi(x,t) = \cos\left(2\pi v\left\{t - \frac{\frac{2\pi nv}{c}x + \phi}{2\pi v}\right\}\right) \quad (35)$$

or $$\psi(x,t) = \cos\left(2\pi v\left\{t - \left[\frac{nx}{c} + \frac{\phi}{2\pi v}\right]\right\}\right). \quad (36)$$

A preferred embodiment of the invention will be described hereinbelow in terms of a modulated carrier wave, where the frequency of the carrier and the frequency of the modulation function are various frequencies. In general, the index of refraction is dispersive—that is a function of frequency, i.e., $n = n(v)$. This will be shown to lead to optical system aberrations heretofore overlooked in imaging systems. The dispersion characteristics of actual materials will be described in detail in the description of the preferred embodiments.

Let $$\psi_1(x,t) = \cos\left(2\pi v_1\left\{t - \left[\frac{nx}{c} + \frac{\phi_1}{2\pi v_1}\right]\right\}\right). \quad (37)$$

where it will be understood that $\psi_1(x,t)$ is a wave with frequency $v_1$, phase $\phi_1$, and $n = n(v)$. Applying the shift theorem, $$\mathcal{F}\{\psi_1(x,t)\} = e^{-i2\pi\left[\frac{nx}{c}+\frac{\phi_1}{2\pi v_1}\right]s}\tfrac{1}{2}\{\delta(s-v_1) + \delta(s+v_1)\}. \quad (38)$$

Applying the sifting theorem, $\mathcal{F}\{\psi_1(x,t)\} = 0$ for all s, except at $s = v_1$, and $s = -v_1$. This requires that n be the value of n at frequency $v_1$, or $$\mathcal{F}\{\psi_1(x,t)\} = \tfrac{1}{2}e^{-i(2\pi n_{v_1}xv_1/c+\phi_1)}\delta(s-v_1) + \tfrac{1}{2}e^{i(2\pi n_{v_1}xv_1/c+\phi_1)}\delta(s+v_1) \quad (39)$$

where $n_{v_1}$ is $n(v)$ at frequency $v_1$.

Equation 39 is better understood by an illustration, similar to FIG. 6.7 in Bracewell [10]. FIG. 1 shows a pair of $\delta$ functions at $s = v_1$ 10 and $s = -v_1$ 11 in the complex plane, with real axis 16, imaginary axis 17, and frequency axis 18. The $\delta$ functions 10, 11 are shown initially along the real axis 16. The $\delta$ function at $s = v_1$ 10 is rotated in the complex plane in the negative, clockwise, direction by $2\pi n_1 x v_1/c + \phi_1$ 12 radians from the real axis 16; and the $\delta$ function at $s = -v_1$ 11 is rotated in the complex plane in the positive, counter clockwise, direction by $2\pi n_1 x v_1/c + \phi_1$ 13 from the real axis 16. The result of shifting the $\delta$ functions 10, 11 in the time domain is to rotate them in the complex frequency domain to form new $\delta$ functions 14, 15 at the same frequencies.

6.2.7 Optical Amplitude Modulated Traveling Wave in the Fourier Domain

Assume a monochromatic carrier wave, such as a laser source, oscillates at a first frequency $v_1$, and is amplitude modulated by a second monochromatic function, such as an electrical signal produced by a crystal oscillator, at a second frequency $v_2$. It will be recognized that modulating a carrier wave is well known in the art. For example, a laser diode may be directly modulated by the electrical driving signal, or the beam may be externally modulated by chopping, polarization rotation, acousto-optical devices, etc. It will also be recognized that it is not necessary that either the carrier or modulator be of a pure single frequency, e.g., chopping, or pulsing, produces additional harmonics. In general, the same analysis can be conducted for a superposition of frequencies for both the carrier and modulation. While the invention is explained in terms of a continuous wave (CW) system, the same principles may be applied to pulsed time of flight systems, polarization modulated systems, etc. In order to more clearly illustrate the salient features of the invention, the analysis will be in terms of a single carrier frequency $v_1$ and a single modulation frequency $v_2$.

The modulation function can be written in the same form as equation 37

$$\psi_2(x, t) = \cos\left(2\pi v_2\left\{t - \left[\frac{nx}{c} + \frac{\phi_2}{2\pi v_2}\right]\right\}\right) \tag{40}$$

and the Fourier transform has the same form as equation 38.

In most schemes, modulation of the carrier corresponds to multiplication of the power in the time domain. Since the output power can not be negative, the modulation is usually biased positive with a modulation depth M, where $0 \le M \le 1$. In this case, a modulated carrier can be expressed as $$\tilde{\psi}(x,t) = \psi_1(x,t)(1 + M\psi_2(x,t)). \tag{41}$$

From equations 37 and 40

$$\tilde{\psi}(x, t) = \tag{42}$$
$$\left\{\cos\left(2\pi v_1\left\{t - \left[\frac{nx}{c} + \frac{\phi_1}{2\pi v_1}\right]\right\}\right)\right\}\left\{1 + M\cos\left(2\pi v_2\left\{t - \left[\frac{nx}{c} + \frac{\phi_2}{2\pi v_2}\right]\right\}\right)\right\}$$

which can be expanded as $$\tilde{\psi}(x, t) = \cos\left(2\pi v_1\left\{t - \left[\frac{nx}{c} + \frac{\phi_1}{2\pi v_1}\right]\right\}\right) + \tag{43}$$
$$M\cos\left(2\pi v_1\left\{t - \left[\frac{nx}{c} + \frac{\phi_1}{2\pi v_1}\right]\right\}\right)\cos\left(2\pi v_2\left\{t - \left[\frac{nx}{c} + \frac{\phi_2}{2\pi v_2}\right]\right\}\right).$$

It will be recognized that the first term of equation 43

$$\cos\left(2\pi v_1\left\{t - \left[\frac{nx}{c} + \frac{\phi_1}{2\pi v_1}\right]\right\}\right) \tag{44}$$

is simply the carrier component $\psi_1(x,t)$ as already described in equation 37 in the time domain, and in equation 38 in the Fourier domain. The second component is the more interesting term.

It will be helpful to transform into the Fourier domain, which can be written $$\mathcal{F}\{\tilde{\psi}(x, t)\} = \mathcal{F}\{\psi_1(x, t)\} + \tag{45}$$
$$\mathcal{F}\left\{M\cos\left(2\pi v_1\left\{t - \left[\frac{nx}{c} + \frac{\phi_1}{2\pi v_1}\right]\right\}\right)\cos\left(2\pi v_2\left\{t - \left[\frac{nx}{c} + \frac{\phi_2}{2\pi v_2}\right]\right\}\right)\right\}.$$

Using the results of equation 38, this can be written as $$\mathcal{F}\{\tilde{\psi}(x, t)\} = e^{-i2\pi\left[\frac{nx}{c} + \frac{\phi_1}{2\pi v_1}\right]s}\frac{1}{2}\{\delta(s - v_1) + \delta(s + v_1)\} + \tag{46}$$
$$\left\{e^{-i2\pi\left[\frac{nx}{c} + \frac{\phi_1}{2\pi v_1}\right]s}\frac{M}{2}\{\delta(s - v_1) + \delta(s + v_1)\}\right\} *$$
$$\left\{e^{-i2\pi\left[\frac{nx}{c} + \frac{\phi_2}{2\pi v_2}\right]s}\frac{1}{2}\{\delta(s - v_2) + \delta(s + v_2)\}\right\}.$$

Applying the convolution theorem followed by the sifting theorem for evaluating n(v), as in equation 39

$$\mathcal{F}\{\tilde{\psi}(x, t)\} = \frac{1}{2}e^{-i\left(2\pi x v_1\frac{nv_1}{c} + \phi_1\right)}\delta(s - v_1) + \frac{1}{2}e^{i\left(2\pi x v_1\frac{nv_1}{c} + \phi_1\right)}\delta(s + v_1) + \tag{47}$$
$$\frac{M}{4}e^{-i\left\{2\pi x\,(v_1 + v_2)\frac{nv_{(1+2)}}{c} + (\phi_1 + \phi_2)\right\}}\delta(s - (v_1 + v_2)) +$$
$$\frac{M}{4}e^{-i\left\{2\pi x\,(v_1 - v_2)\frac{nv_{(1-2)}}{c} + (\phi_1 - \phi_2)\right\}}\delta(s - (v_1 - v_2)) +$$
$$\frac{M}{4}e^{i\left\{2\pi x\,(v_1 + v_2)\frac{nv_{(1+2)}}{c} + (\phi_1 + \phi_2)\right\}}\delta(s + (v_1 + v_2)) +$$
$$\frac{M}{4}e^{i\left\{2\pi x\,(v_1 - v_2)\frac{nv_{(1-2)}}{c} + (\phi_1 - \phi_2)\right\}}\delta(s + (v_1 - v_2))$$

where: $n_{v_1}$ is $n_v$ at the carrier frequency, i.e., $v = \pm v_1$; $n_{v(1-2)}$ is $n_v$ at the upper sideband, i.e., $v = \pm(v_1 + v_2)$; $n_{v(1-2)}$ is $n_v$ at the lower sideband, i.e., $v = \pm(v_1 - v_2)$. Note that $n_v$ is the same for positive and negative frequency.

Figure 2A:
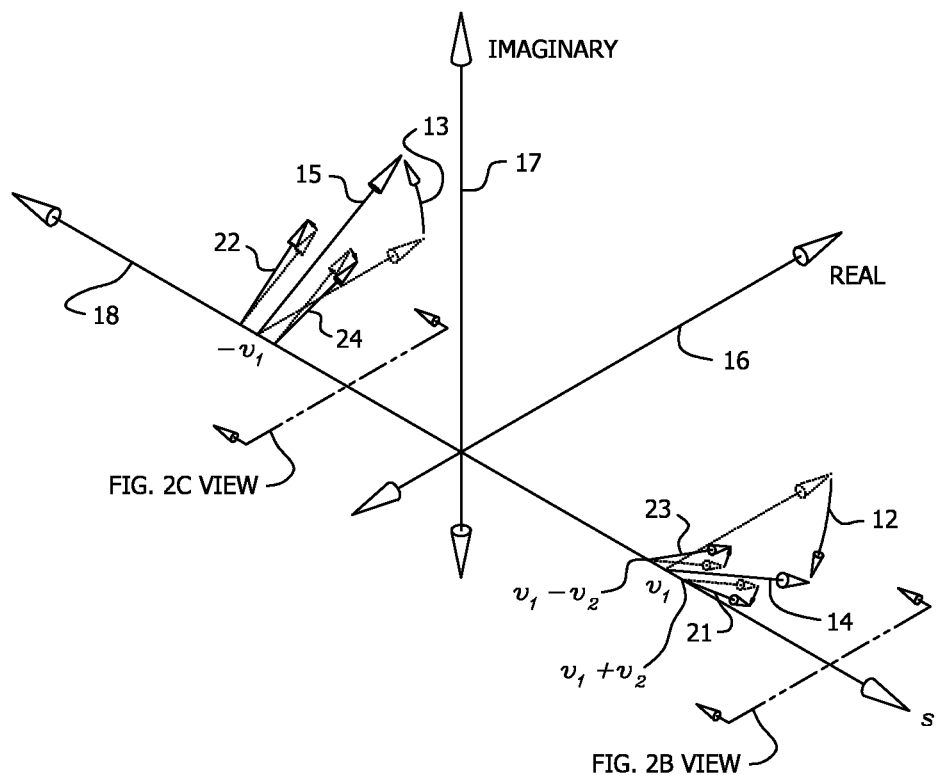
FIG. 2A is a 3D diagram illustrating the effect of a phase shift and amplitude modulation in the frequency domain.

Notice that in addition to the shifted carrier at $\delta(s - v_1)$ 14 and $\delta(s + v_1)$ 15, as shown in FIG. 1, the modulation function $\psi_2(x,t)$ of modulation depth M at frequency $v_2$ gives rise to four additional sidebands of amplitude M/4, as shown in FIG. 2A, at; $\delta(s - (v_1 + v_2))$ 21, $\delta(s - (v_1 - v_2))$ 23, $\delta(s + (v_1 + v_2))$ 22, and $\delta(s + (v_1 - v_2))$ 24, and all four sidebands 21, 22, 23, 24 are rotated in the complex plane by different phase angles. Notice that the sidebands are centered on the carrier frequency $\pm v_1$ 14, 15 and are spaced by the modulation frequency $\pm v_2$ on either side of the carrier on the frequency axis 18.

Figure 2B:
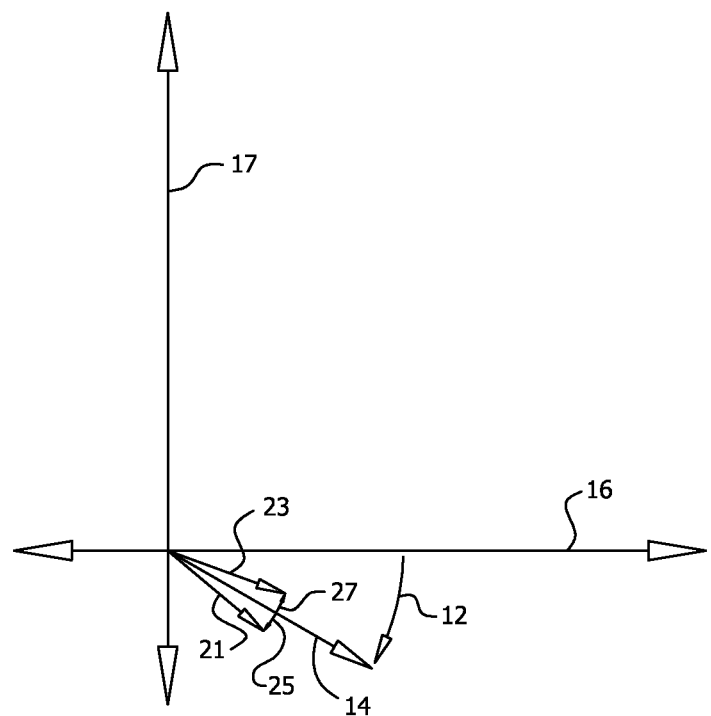
FIG. 2B is a diagram in the complex plane of the positive carrier and sidebands.

Notice that a phase shift in the positive frequency carrier $v_1$ 14, such as due to x or $\phi_1$, rotates the transform in the complex plane with respect to the real axis, and the sidebands 21, 23 rotate along with the carrier 14. This is better illustrated in FIG. 2B, which is a view in the complex plane 16, 17, looking down the frequency axis 18 in the negative direction. As will be recognized by those skilled in the art, from equation 47, the positive frequency carrier 14 is rotated with respect to the real axis 16 by angle 12. Also from equation 47, the upper sideband 21 is rotated with respect to the carrier 14 by an additional angle 25. The lower sideband 23 is rotated with respect to the carrier 14 by angle 27. Notice that the two sidebands rotate in opposite directions with respect to the carrier. The phase shift of the modulation can be visualized as riding on the back of the carrier.

Also note from equation 47 that the magnitude of the rotation 25 of the upper sideband 21 is not exactly the same as the rotation 27 of the lower sideband 23. This is because the upper sideband 21 is rotated by a factor of $n_{v_{(1+2)}}$, while the lower sideband is rotated by a factor of $n_{v_{(1-2)}}$. Due to dispersion, there is a slight difference between the sidebands. This slight asymmetry is the heart of the dispersion problem.

Figure 2C:
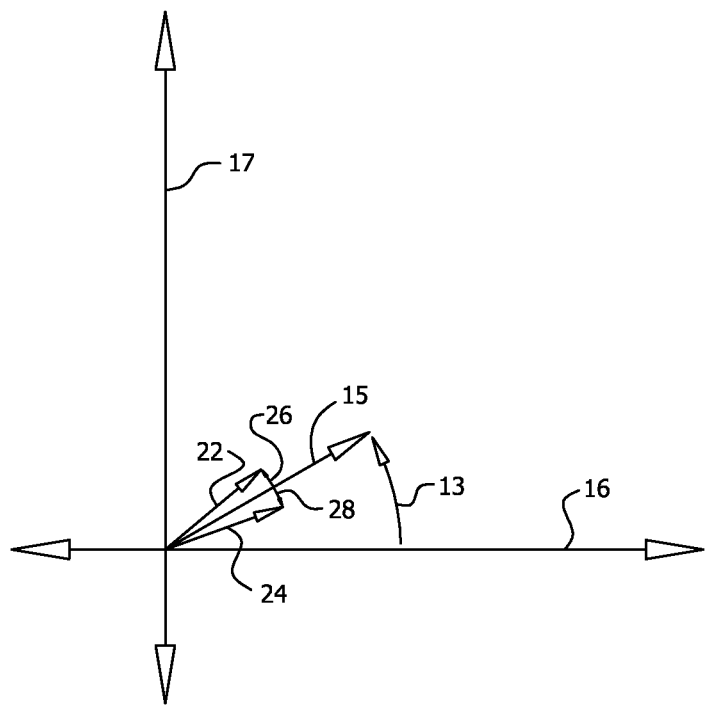
FIG. 2C is a diagram in the complex plane of the negative carrier and sidebands.

The same analysis can be conducted for the negative frequency carrier 15 as shown in FIG. 2C where negative frequency carrier 15 is rotated by angle 13 which is the exact magnitude of rotation 12, but in the opposite direction. Upper sideband 22 is rotated by angle 26 which is the exact magnitude of rotation 25, but in the opposite direction. The lower sideband 24 is rotated by angle 28 which is the exact magnitude of rotation 25, but in the opposite direction.

In general, a traveling wave can be expressed as a function of time t and position x, and all six Fourier transform components are rotating in the complex plane at different rates. Since the carrier 14 and the sidebands 21, 23 are shifted by different amounts for translations in x, it can be shown that all three phasors do not repeat their respective phase angles 12, 25, 27 until x is shifted by an amount equivalent to the wavelength of the beat note. Moreover, due to dispersion, the wavelength of the beat note is slightly longer.

6.3 Index of Refraction and Dispersion

The index of refraction n is well known in the art and will not be explained in detail herein. Jenkins and White [3] contains a good review of dispersion in Chapter 23, the disclosure of which is incorporated by reference herein. SCHOTT North America, Inc. provides a wealth of information on optical glasses on the internet. Publication TIE-29: [17], the disclosure of which is incorporated by reference herein, is an excellent guide to the data.

It is customary to tabulate the index of refraction at the Fraunhofer lines. From TIE-29, $n_C$ is at the red hydrogen line $\lambda$=656.2725 nm, $n_D$ is at the yellow sodium line $\lambda$=589.2938 nm, and $n_F$ is at the blue hydrogen line $\lambda$=486.1327 nm. The principal dispersion is the difference in n between the F and C lines, i.e., $n_F - n_C$, and is a frequently cited constant for a particular glass. The index of refraction is modeled by the Sellmeier dispersion equation $$n^2(\lambda) - 1 = \frac{B_1 \lambda^2}{(\lambda^2 - C_1)} + \frac{B_2 \lambda^2}{(\lambda^2 - C_2)} + \frac{B_3 \lambda^2}{(\lambda^2 - C_3)} \quad (48)$$

where $B_1$, $C_1$, $B_2$, $C_2$, $B_3$, and $C_3$ are constants for each glass type.

The most common glass used in optical elements is BK7, and will be used in the example problems herein. The SCHOTT data sheet on BK7 [18], the disclosure of which is incorporated by reference herein, shows $n_C$=1.514 32, $n_D$=1.516 73, $n_F$=1.522 38, and the principal dispersion $n_F - n_C$=0.008 054. The constants for the Sellmeier dispersion equation are also in the data sheets for each glass type. While glass is the most common material for optical components, it will be recognized that other materials may be selected to advantage, depending on the wavelengths and design constraints. Such materials may include plastics, gases, liquids—such as specialty optical liquids available from companies such as Cargille-Sacher Laboratories, Inc., or other dielectric materials.

Although it is customary to work in wavelength in the optics industry, it is easier to work in frequency in the Fourier domain, where $v=c/\lambda$ and $c$=2.997 924 58×10⁸ m/s. For example; at the C red line, $v_C$=456810.9 GHz; at the D yellow line, $v_D$=508731.7 GHz; and at the F blue line $v_F$=616 688.5 GHz.

To get a feel for the magnitude of the dispersion as a function of frequency, consider the derivative of n with respect to v, which can be approximated at $v_D$ using the principal dispersion for BK7, or $$\frac{\Delta n}{\Delta v} = \frac{n_F - n_C}{v_F - v_C} \quad (49)$$

$$= \frac{0.008054}{159877.6 \text{ GHz}}$$

$$= 5.037604 \times 10^{-8}/\text{GHz}.$$

The change in n over a few GHz is very small—in fact it is much less than the uncertainty of n for a batch of glass. As it will be shown, this subtle change in n between the upper sideband and the lower sideband has a very significant impact on the phase of the modulated wave, or the beat note produced by the interference between the upper and lower sidebands. It will be recognized that the Sellmeier dispersion equation may be differentiated for a closer estimation at a specific wavelength, e.g., centered on a carrier frequency $v_1$, but the approximation simplifies illustration of the idea.

6.3.1 Optical Amplitude Modulated Traveling Wave Propagating Through BK7 Glass

Some examples of modulated traveling waves $\tilde{\psi}(x,t)$, propagating through BK7 glass will be given. Returning to equation 47, assume the carrier wave $\psi_1(x,t)$ in equation 37 is at the yellow D line, i.e., $v_1=v_D$=508 731.7 GHz, and the index of refraction $v_{v_1}=n_D$=1.516 73. Returning to equation 40, assume the modulation wave $\psi_2(x,t)$ is modulating the carrier at 1.5 GHz, i.e., $v_2$=1.5 GHz, which is a reasonable modulation frequency used for electronic distance measurement. Also assume the glass thickness is 10 mm which is a reasonable order of magnitude thickness for an optical window, or lens. Note that a modulation frequency of 1.5 GHz is about 3×10⁻⁶$v_1$. Some instruments operate as low as one part in 10⁻⁶, but they tend to be lower precision. Work underway in the THz range indicate it would be expected to see the modulation increase to the order of 5 THz, or one part in 10⁻².

6.3.2 Ignoring Dispersion

In the first example, assume the glass has no dispersion, i.e., $n_{v_{(1+2)}}=n_{v_{(1-2)}}=n_D$, as shown in FIGS. 1, 2A, 2B, and 2C. Consider the Fourier component of the positive frequency carrier component 14 of equation 47, which is rotated by phase angle 12 and can be written as $$\Psi_{+c} = e^{-i\left(2\pi x v_1 \frac{n v_1}{c} + \phi_1\right)} \delta(s - v_1) \quad (50)$$

where it will be understood that there is a symmetrical negative frequency component 15 which is rotated by phase angle 13, and can be written as $$\Psi_{-c} = e^{i\left(2\pi x v_1 \frac{n v_1}{c} + \phi_1\right)} \delta(s + v_1). \quad (51)$$

We will ignore the amplitude and the negative frequency component for now, since it is the phase that is of interest. Substituting into equation 50, $$\Psi_{+c} = e^{-i\left(2\pi\ 0.01\ m\ 508731.7\times10^9/s\frac{1.51673}{2.99792458\times10^8 m/s}+\phi_1\right)} \quad (52)$$

$$\delta(s-508731.7\times10^9/s)$$

or $$\Psi_{+c} = e^{-i(2\pi\ 25738.0953+\phi_1)}\delta(s-508731.7\times10^9/s). \quad (53)$$

Notice that Equation 53 can be represented as a phasor rotating in the negative direction at $\nu_D$ with a phase angle 12 of $-(2\pi\ 25\ 738.0953+\phi_1)$. Since the phasor is mod($2\pi$), the phase angle is $-(2\pi\ 0.095\ 3+\phi_1)$ radians, or the carrier entering a 10 mm thick window of BK7 glass with phase $\phi_1$, undergoes 25 738 complete cycles plus $2\pi\ 0.095\ 3$ radians when it exits the other side of the window. Phasor notation is typically used for a single frequency, where phasors can be combined. In this application, we will be using phasors at the carrier, upper sideband, and the lower sideband frequencies, so to avoid mistakes, the frequency will be explicitly tied to the phasor. The phasor of the carrier frequency can be written $$\Psi_{+c}=\delta(s-\nu_D)\angle-(2\pi 0.095\ 3+\phi_1) \quad (54)$$

where the phase angle 12 is $-(2\pi\ 0.0953+\phi_1)$.

Consider the positive upper sideband component 21 of equation 47, which can be written as $\Psi_{+c}$ that $$\hat{\Psi}_{+c} = e^{-i\left\{2\pi x\ (\nu_1+\nu_2)\frac{n_{\nu(1+2)}}{c}+(\phi_1+\phi_2)\right\}}\delta(s-(\nu_1+\nu_2)) \quad (55)$$

and the positive lower sideband component 23 of equation 47, which can be written as $\Psi_{+c}$ check $$\check{\Psi}_{+c} = e^{-i\left\{2\pi x\ (\nu_1-\nu_2)\frac{n_{\nu(1-2)}}{c}+(\phi_1-\phi_2)\right\}}\delta(s-(\nu_1-\nu_2)). \quad (56)$$

Substituting in for the upper frequency $\nu_D$+1.5 GHz, the phase angle is the sum of the phase angles 12+25

$$e^{-i(2\pi 25\ 738.1712+\phi_1+\phi_2)}\delta(s-508\ 733.2\times10^9/s) \quad (57)$$

or $$\hat{\Psi}_{+c}=\delta(s-(\nu_D\pm1.5\ \text{GHz}))\angle-(2\pi 0.171\ 2+\phi_1+\phi_2). \quad (58)$$

Substituting in for the lower frequency $\nu_D$−1.5 GHz, the phase angle is 12−27

$$e^{-i(2\pi 25\ 738.0194+\phi_1-\phi_2)}\delta(s-508\ 730.2\times10^9/s). \quad (59)$$

or $$\check{\Psi}_{+c}=\delta(s-(\nu_D-1.5\ \text{GHz}))\angle-(2\pi 0.019\ 4+\phi_1-\phi_2). \quad (60)$$

Notice the form of equation 47. The upper and lower sidebands are a result of convolving the modulation function with the carrier function, i.e., the sidebands are spaced $\nu_2$ from the carrier $\nu_1$. Notice also that the phases of the sidebands are rotated asymmetrically around the carrier. It will be instructive to recast the upper and lower sideband phase angles into components due to the carrier and components due to the modulation. Equation 58 can be written $$\hat{\Psi}_{+c}=\delta(s-(\nu_D+1.5\ \text{GHz}))\angle-(2\pi(0.0953-0.0759)+\phi_1+\phi_2) \quad (61)$$

and equation 60 can be written $$\check{\Psi}_{+c}=\delta(s-(\nu_D-1.5\ \text{GHz}))\angle-(2\pi(0.0953-0.0759)+\phi_1-\phi_2). \quad (62)$$

In the example of a non-dispersive glass 10 mm thick, the carrier component $\Psi_{+c}$ emerges delayed by 25 738 complete cycles plus $2\pi\ 0.0953$ radians. The upper sideband $\hat{\Psi}_{+c}$ emerges delayed by 25 738 complete cycles plus $2\pi(0.0953+0.0759)$ radians, and the lower sideband $\check{\Psi}_{+c}$ emerges delayed by 25 738 complete cycles plus $2\pi(0.0953-0.0759)$ radians.

It can be shown that the asymmetric delay between the upper and lower sidebands is the equivalent of a delay of the modulation envelope, of $2\pi\ 0.0759$ radians of the 1.5 GHz modulation signal, or a time equivalent to $xn_D/c$. This can be expressed as a phasor for the modulation envelope of $$\Psi_{+m}=\delta(s-1.5\ \text{GHz})\angle-(2\pi 0.0759+\phi_2). \quad (63)$$

6.3.3 Including Dispersion

Turning now to the more realistic case where the glass is dispersive. It will be shown how a small difference in the refractive index can have a significant impact on the delay of the modulation envelope.

In the second example, using equation 49 to estimate the dispersion, assume $$n_{\nu(1+2)} = n_D + \frac{\Delta n}{\Delta \nu}1.5\ \text{GHz} \quad (64)$$
$$= n_D + 7.556406\times10^{-8}$$

and $$n_{\nu(1-2)} = n_D - \frac{\Delta n}{\Delta \nu}1.5\ \text{GHz} \quad (65)$$
$$= n_D - 7.556406\times10^{-8}.$$

Substituting back into equation 47, the dispersion results in the upper sideband being shifted by an additional phase angle of $2\pi\ 1.282\times10^{-3}$ radians in the negative direction, and the lower sideband being shifted in the positive direction by almost the same magnitude, i.e., $2\pi\ 1.282\times10^{-3}$ radians. Or $$\hat{\Psi}_{+c}=\delta(s-(\sigma_D+1.5\ \text{GHz}))\angle-(2\pi(0.0953+0.0759+1.282\times10^{-3})+\phi_1+\phi_2) \quad (66)$$

and $$\check{\Psi}_{+c}=\delta(s-(\nu_D-1.5\ \text{GHz}))\angle-(2\pi(0.0953-0.0759-1.282\times10^{-3})+\phi_1-\phi_2). \quad (67)$$

As shown in equation 63, the modulation envelope can be expressed as a phasor $$\Psi_{+m}=\delta(s-1.5\ \text{GHz})\angle-(2\pi(0.0759+1.282\times10^{-3})+\phi_2). \quad (68)$$

Note that the dispersion delays the envelope by an additional $2\pi 1.282\times10^{-3}$ radians.

A phase shift of <<0.1λ is much less than the accuracy of grinding a lens! However, the differential phase shift between the upper sideband and lower sideband has a significant impact on a phase measurement instrument-such as an electronic distance measurement instrument. Notice that the dispersion results in an additional phase shift of the upper and lower sidebands of $2\pi\ 1.282\times10^{-3}$ radians. Notice that this is an additional fractional delay of the modulation envelope of the 1.5 GHz signal of $1.282\times10^{-3}$ out of 0.0759 or over 1.68%, i.e., a difference in the index of refraction of $7.556\ 406\times10^{-8}$ produces a 1.68% increase in the delay of the modulation signal through the glass! Notice that if this is not properly corrected, it would result in an error of approximately 0.168 mm—which is a significant error for precision EDM instruments.

An integrating detector, which collects energy over a period of time, such as film or a CCD would not be sensitive to a small phase shift of a fraction of the integration period. However, as will be shown hereinbelow, the differential phase shift between the upper sideband and lower sideband has a significant impact on a phase measurement instrument-such as an electronic distance measurement instrument. Moreover, it will be shown that the phase shift for refractive optical elements, such as lenses and windows in a converging, or diverging, beam are not constant over the wavefront.

Figure 3:
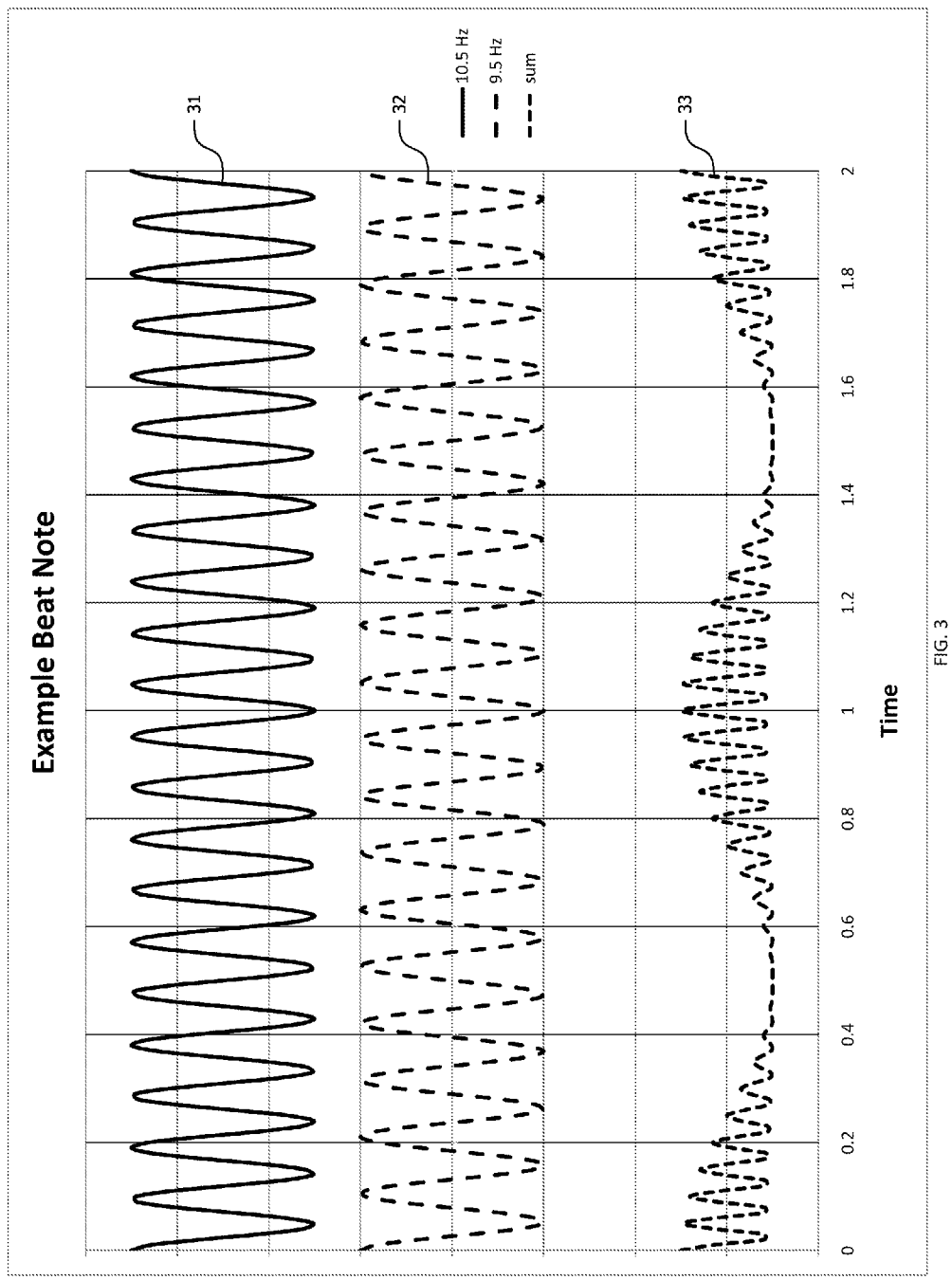
FIG. 3 is a diagram illustrating the interference of an upper sideband and a lower sideband to generate a beat note.
Figure 4:
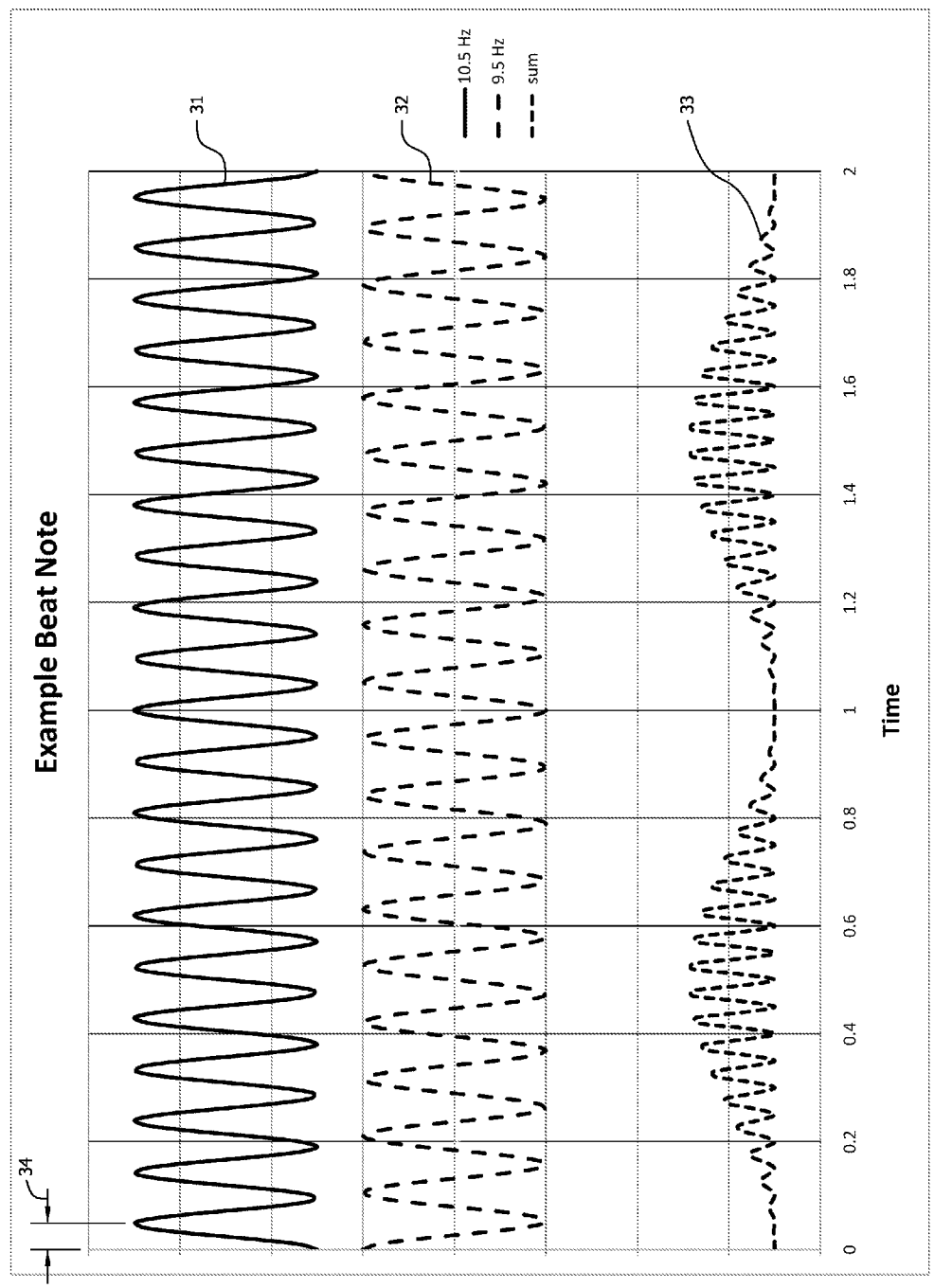
FIG. 4 is a diagram illustrating the interference of an upper sideband and a lower sideband to generate a beat note, and the effect of a phase shift on the beat note.

An example will illustrate the effect. As shown in FIG. 3, a 10 Hz carrier modulated by a 0.5 Hz modulating signal, generates an upper sideband 31 at 10.5 Hz, and a lower sideband 32 at 9.5 Hz. The power of the beat note 33 is produced by the square of the sum of the upper 31 and lower 32 sidebands at 0.5 Hz. As shown in FIG. 12I of Jenkins and White [3], the wavelength Λ of the beat note is $$\Lambda = \frac{\lambda_1 \lambda_2}{\lambda_1 - \lambda_2} \quad (69)$$

where $\lambda_1$ is the wavelength of the lower sideband 32 and $\lambda_2$ is the wavelength of the upper sideband 31. Note that the wavelength of the power is divided by 2. In FIG. 3, the phase angle between the lower and upper sidebands is 0. FIG. 4 shows the same functions, except the upper sideband 31 is delayed in phase by π.

Notice that the relative phase shift between the lower 32 and upper sidebands 31 produces the same phase shift in the beat note 33. This is a fundamental principle that warrants further illustration.

Consider a gedanken, or thought, experiment. In FIG. 3, if the upper sideband 31, or the lower sideband 32 is shifted by a complete period, the beat note 33 will be invariant. As shown in FIG. 4, delaying the upper sideband 31 by π 34, shifted the beat note 33 by the same relative amount, i.e., π. This illustrates the fact that a differential phase shift between the upper 31 and lower 32 sidebands corresponding to a fraction of a micron produces a corresponding fractional phase shift of the beat note 33. Whereas the phase shift of the upper sideband 31 for an optical signal may correspond to a fraction of a micron, the corresponding phase shift of the much longer wavelength beat note may correspond to the equivalent of millimeters. Moreover, shifting the upper sideband 31 and lower sideband 32 together, has minimal effect on the beat note 33. At frequencies of the order of light, the effect on the beat note 33 would be practically undetectable. This explains why a lens ground to an accuracy of λ/4 has little effect on the beat note 33, yet the dispersion through 10 mm of glass can have a significant effect on the beat note 33.

6.4 Suppressed Carrier and Other Modulation Systems

While amplitude modulation is the classical method for generating a beat note, it will be recognized that there are other ways to generate two sidebands of slightly different frequency without a carrier. For example, U.S. Pat. No. 3,656,853 to Bagley et al., uses a two frequency laser to produce two frequencies separated by 500 kHz. U.S. Pat. No. 5,784,161 to Bechstein et al., uses two lasers which are tuned to produce the desired beat note. U.S. Pat. No. 7,684,023 to Kang et al., uses two lasers to produce THz waves. US 2010/0046003 to Le Floch et al., uses tunable lasers to produce chirped frequencies. U.S. Pat. No. 5,781,334 to Daendliker et al. teaches the generation of synthetic light wavelengths using two light sources.

With OAM the sidebands are inherently coherent, and all sidebands travel together over the same optical path lengths. This can be thought of much like Malacara [5] describes as common-path interferometry in chapter 3 of his book. This results in a beat note with a practically infinite coherence length, whereas dual sources may have shorter coherence lengths. It will be recognized that it is not necessary that the carrier be narrowband. In fact, although the invention has been illustrated in terms of a narrowband carrier, the invention applies to broadband carriers also.

It will also be recognized that while the invention has been described in an embodiment of a single beat note, it will be recognized that other systems may be analyzed in the same spirit. For example, square wave modulation can be analyzed as a superposition of harmonic sinusoidal modulation functions. Frequency, phase, and polarization modulation can also be analyzed using the same methodology.

6.5 Wavefront Through a Lens

Turning now to some examples, it will be shown how inhomogeneities in the OAM wavefront of the beat note can produce errors in EDM instruments.

Figure 5:
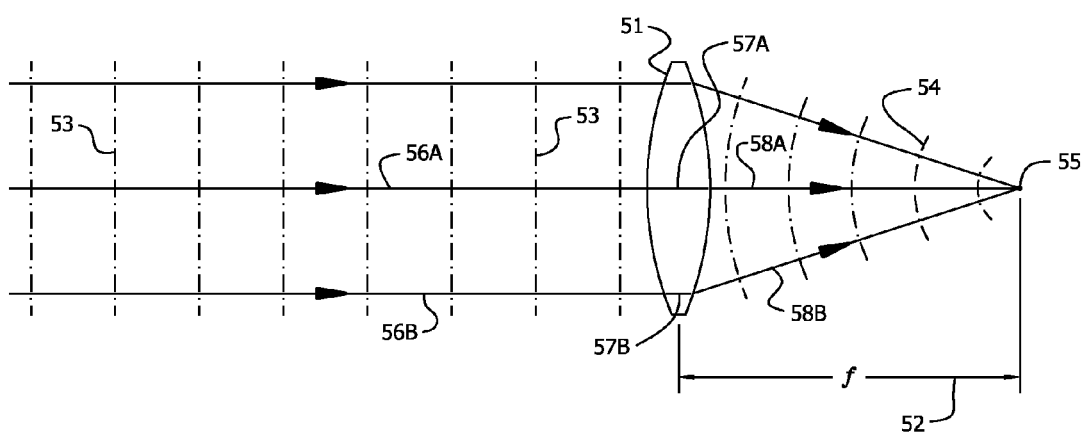
FIG. 5 is a diagram illustrating Fermat's principle for an ideal lens.

Consider an ideal converging lens 51, as shown in FIG. 5, designed to focus an object at infinity to a plane at a distance equal to the focal length $f$ 52, i.e., designed for infinite conjugate ratio. While the invention is described by example of infinite conjugate ration, it will be recognized that the same principles apply to other conjugate ratios, or adjustable conjugate rations—such as zoom lenses. A monochromatic light source at infinity produces a plane wave 53 at the lens 51, and the lens 51 converts the plane wave 53 to spherical waves 54 which focuses the plane wave 53 to a point 55 at the focal length 52. Lenses are routinely designed, built, and tested that perform this function with wavefronts flat to an accuracy of a fraction of the design wavelength λ.

In a simple explanation, the transformation of a lens can be explained by Fermat's principle which, in this example, requires the transit time to be equal for all rays from the source, through the lens, to the focal point. In the ideal case, all of the rays from a coherent source would converge at the focal point in phase. From Fermat's principle, a ray passing through the optical axis 56A, 57A, 58A must be delayed through the lens 51 longer than a ray passing through the edge 56B, 57B, 58B of the lens 51, since the ray passing through the edge 56B, 57B, 58B of the lens 51 must travel farther to the focal point 55. Thus the lens, which has a higher index of refraction n than air, is thicker in the center and thinner at the edges.

In the simple approximation, a thin lens can be constructed by grinding the front and back surfaces to spherical surfaces designed by the well known lens maker's formula, as described in chapter 4 "Thin Lenses" of Jenkins and White [3], the disclosure of which is incorporated by reference herein. The lens maker's formula is derived in section 4.15 and can be approximated as $$\frac{1}{p} + \frac{1}{q} = (n-1)\left(\frac{1}{r_1} - \frac{1}{r_2}\right) \quad (70)$$

where p is the object distance, q is the image distance, n is the index of refraction for the lens and the index of refraction of the medium outside the lens is assumed to be unity, $r_1$ is the radius of curvature of the object side of the lens, and $r_2$ is the radius of curvature of the image side of the lens. The focal length $f$ is given by $$\frac{1}{f} = (n-1)\left(\frac{1}{r_1} - \frac{1}{r_2}\right) \quad (71)$$

or $$\frac{1}{p} + \frac{1}{q} = \frac{1}{f}. \quad (72)$$

Goodman gives a more rigorous derivation in section 5.1 "A Thin Lens as a Phase Transformation" [8], the disclosure of which is incorporated by reference herein. The idea is stated in section 5.1 as A lens is composed of an optically dense material, usually glass with a refractive index of approximately 1.5, in which the propagation velocity of an optical disturbance is less than the velocity of air. With reference to Appendix B, a lens is said to be a thin lens if a ray entering at coordinates (x,y) on one face exits at approximately the same coordinates on the opposite face, i.e., if there is negligible translation of a ray within the lens. Thus a thin lens simply delays an incident wavefront by an amount proportional to the thickness of the lens at each point.

The exact equations for the thickness function are developed in section 5.1.1, and the paraxial approximation is given as a function of (x,y). For the paraxial approximation $$\Delta(x, y) = \Delta_0 - \frac{x^2 + y^2}{2}\left(\frac{1}{r_1} - \frac{1}{r_2}\right) \quad (73)$$

where $\Delta_0$ is the thickness at (x,y)=(0,0). This can be cast in the form of the focal length $f$ as $$\Delta(x, y) = \Delta_0 - \frac{x^2 + y^2}{2f(n-1)}. \quad (74)$$

Of course with a computer model, it is not necessary to make the approximations, and a computer model also works for aspherical lenses.

Notice that $\Delta(x,y)$ is quadratic as a function of the distance from the center of the lens. Moreover, since the area of a ring is $2\pi r\, dr$, the wavefront distortion is weighted more at the outer part of a lens. For example, most total stations project a large beam, and use large retroreflectors which return beams twice the diameter of the retroreflector—which is typically three inches in diameter. Since the objective lens of a typical total station is around three inches, this wavefront distortion could introduce a systematic error in the distance measurement.

In the examples developed hereinabove and illustrated in FIGS. 1, 2A, 2B and 2C, the phase shift was assumed to be uniform over the plane, e.g., a plane wave and a flat optical window. In that case, the phase of the OAM envelope is simply delayed by a constant, which is easily corrected in an instrument. In the case of a lens, the analysis must be extended to make the thickness of the glass, and thus the phase shift, a function of (x,y).

In the case of an OAM beam producing a beat note, Goodman's notion of a thin lens as a phase transformation would need to be extended to at least two sideband wavefronts of frequencies $(v_1+v_2)$ and $(v_1-v_2)$, and a carrier wavefront of frequency $v_1$, with delays not only proportional to thickness of the lens at each point, but also accounting for dispersion in the refractive index.

The quotation above could be amended [as shown in square brackets] to read.

Thus a thin lens simply delays an incident wavefront [of a superposition of carrier frequency $v_1$ and sidebands $(v_1+v_2)$, and $(v_1-v_2)$] by an amount proportional to the thickness of the lens at each point [and the index of refraction at each respective frequency].

Ray tracings converge to the model based on the carrier $v_1$, but the shape of the modulated, or beat note, wavefront will be dominated by the dispersion and thickness inhomogeneity. For EDM applications, the optical system is typically designed to collect the light and focus the energy on an ideal point detector. The detector cannot respond to the optical frequency, but is fast enough to respond to the much lower frequency of the power of the beat note envelope. Conventional optical design techniques work fine for modeling the collection of light on a detector, i.e., the optical paths of the sidebands are almost identical to the carrier, and the ray tracings at the carrier will model all 3 frequencies as to the time-invariant beam shaping.

In a more realistic case, the notion would also need to be extended to a model for thick lenses. While this depth of analysis would probably not be inviting to do manually, it is relatively simple to model using optical design software.

Time-invariant lens aberrations are well known in the art as described in chapter 9 "Lens Aberrations", of Jenkins and White[3], the disclosure of which is incorporated by reference herein. For EDM applications, most instruments are dealing with special imaging conditions, such as; infinite conjugate ratio, narrow bandwidths, paraxial illumination, etc. Most of the classical aberrations, such as coma and astigmatism are not particularly important—although they may be for some optical systems and the invention is not limited to simple optical systems, nor to EDM.

Two types of aberration will be particularly useful to illustrate benefits of the invention. The term spherical aberration is used to describe how rays passing through the outer edges of a lens don't exactly pass through the ideal focal point. It is well know in the art to correct for spherical aberration by aspherizing the surfaces to make aspherical lenses. The term chromatic aberration is used to describe how two wavelengths, or colors, don't exactly pass through the ideal focal point. More will be said about both of these aberrations hereinbelow.

In general, it is complicated to optimize the design of even a thin lens for a monochromatic plane wave. The simplest approximation in the lens maker's formula in equation 70 shows that for a given focal length $f$ and frequency $v$, there are choices of materials and thus the index of refraction n and the radius of curvatures $r_1$ and $r_2$. A more realistic model is given for thick lenses as described by Jenkins and White in chapter 5, "Thick Lenses", the disclosure of which is incorporated by reference herein. In the case of a thick lens, equation 71 is better approximated by $$\frac{1}{f} = (n-1)\left(\frac{1}{r_1} - \frac{1}{r_2}\right) + \frac{(n-1)^2}{n} \frac{t_c}{r_1 r_2} \quad (75)$$

where $t_c$ is the thickness through the center of the lens.

Lens and optical system design is now optimized for time-invariant designs by computer modeling, using programs as described hereinabove. Computer models allow adjustments of all parameters such as wavelength, materials, radius of curvature, thickness, focal length, diameter, etc. in order to optimize the tradeoffs. Moreover, a system may comprise a number of optical elements which are routinely modeled in combination. It will be shown that the models need to be modified to deal with OAM signals.

Returning to the example as shown in FIG. 5 of a plane wave 53 focused by an ideal lens 51 to the focal point 55. In an EDM instrument the plane wave may be collected by a small amplitude squared (power) detector at the focal point, which detects all of the energy of the plane wave collected by the lens. It will be recognized by those skilled in the art that the ideal detector needs to be small in order to avoid the integration of variable phase delays of the electrical signal over the detector, i.e., the objective of EDM is to measure a single well defined time delay, which can be used to calculate distance, or the like, and thus a single phase is required to be measured.

For a finite size detector, the electrical signal produced at the electrical output terminal is integrated over the various path lengths, from the actual location of the signal conversion from light to electrical, to the terminal. For example, radiation impinging on the center of the detector face may produce an electrical signal which may propagate to the terminal with a first time delay, while radiation impinging near an edge of the detector face may produce an electrical signal which may propagate to the terminal delayed significantly longer than the first time delay. Where significantly longer will be understood to be of the order of the time required for light, or an electrical signal, to propagate 1 micron.

The integrated signal at the terminal will be weighted by the power density and quantum efficiency of the detector (which may vary over the detector) as well as the time delays of the wavefront of the beat note. This is analogous to the requirement of a point source of light to produce a well collimated beam, which is well known in the art.

The same configuration as shown in FIG. 5 may be used with a modulated light source at the focal point 55 to produce a collimated beam 53 by the lens 51. From the principle of reversibility, as explained in section 1.8 of Jenkins and White [3], the disclosure of which is incorporated by reference herein, the two cases are symmetrical. Some instruments launch and receive from a common focal point using fiber optics, which approximates a point source and a point detector. For example, WO/2003/062744A1 to Bridges et al., and WO/2007/079600A1 to Meier et al., the disclosure of both of which are incorporated by reference herein, use common fiber optic launch and receive optics. For illustration purposes, it will be easier to show the aberration of the beat note wavefront projected by a modulated point source.

As shown in FIG. 6, a monochromatic and coherent point source at the focal point 55 of an ideal lens 51 produces flat plane waves 53 radiating along the optical axis. In other words, the lens 51 is designed such that the transit time for all rays from the monochromatic point source, through the lens 51, produces a plane wave 53.

Now, as has already been shown, the transit time through glass is slightly different for each wavelength in a dispersive material, such as glass. In the example hereinabove, it was shown that for an OAM signal, the upper sideband is delayed slightly more than the lower sideband, and the magnitude of the delay is directly related to the thickness of the glass. The upper sideband 64 is shown greatly exaggerated to illustrate the effect of dispersion in FIG. 6. Instead of a flat wavefront, as shown for the carrier 53, the upper sideband 64 wavefront is curved with a larger lag near the optical axis. Likewise, the lower sideband 65 is delayed slightly less that the carrier 53.

As a first approximation, the carrier 53, upper sideband 64, and lower sideband 65 all produce flat wavefronts. The exaggerated differential delays shown in FIG. 6 would typically only be a shift of a small fraction of a wavelength, i.e., of the order of nanometers. However, it has been shown that the envelope of the beat note 66 depends on the differential phase delay between the upper 64 and lower 65 sidebands.

Thus it is clear that a lens designed to produce a flat wavefront at the carrier will produce almost perfectly flat wavefronts at both sidebands—but the differential phase between the sidebands will depend on the thickness of the glass as a secondary correction. Thus the ray passing through the center of a converging lens 51 will produce a slightly larger differential phase shift between the upper and lower sidebands than a ray passing through the outer edge of the lens. This results in a distortion of the beat note wavefront 66 with more delay near the optical axis.

It will be recognized that distortion of the beat note wavefront will depend on a number of parameters, including the $f$ number, i.e., the ratio of the focal length to the diameter of the lens. For example, a fast lens with speed $f/1$ would have a much shorter radius of curvature than a slower $f/100$ lens, which would almost be flat.

From the principle of reversibility, to produce a coherent wavefront at the focal point 55 of FIG. 6, the entering wavefront of the carrier 53, upper sideband 64, and lower sideband 65 would have to be distorted the same as shown in FIG. 6. However, if the wavefront was flat, the spherical wavefronts 54 converging on a detector at the focal point 55 would not be homogeneous, i.e., the phase of the signal at the beat note frequency produced by a detector at the focal point 55 would depend on which portion of the wavefront was collected by the detector.

FIG. 6 presents a good illustration as to why the effects of dispersion were developed from first principles. Notice that there are two dominant salient points that a designer needs to consider in an optical design for OAM systems.

The optics must be designed to collect or radiate the power properly.

The phase and shape of the beat note wavefront must be considered.

Both of these constraints are clearly unified using the first principles model.

Most physics and optics books treat dispersion by replacing the index of refraction n by a group index of refraction $n_g$. Notice that if the group index of refraction was used in the lens design, an actual lens would not focus at the theoretical focal length! It is implied that a designer use the index of refraction n for the optical design, and if there is a need to explain the group delay, use $n_g$ as an ad hoc explanation to correct for dispersion. In fact, a two pass design is probably an acceptable way to proceed, but the designer needs to understand the fundamentals in order to understand the limitations of such an ad hoc approach.

If the entire projected beam is reflected by a target, such as a retroreflector, and the collection lens gathers all of the return beam and focuses it on a detector, the wavefront distortion would simply be a constant that can be corrected. This would also be the case for a length of optical fiber, where the various delays would be mixed and averaged by the fiber.

However, it is clear that if any of the beam is obstructed; the target does not retroreflect the entire beam; the return beam is larger than the collection lens; the beam size varies with conditions—such as the distance to the retroreflector, or the size of the retroreflector; or atmospheric turbulence causes the beam to jitter—the integrated phase on the detector will not be invariant. The phase of the integrated signal will depend on which portions of the inhomogeneous beam are collected at the detector.

For example, the beat note of the beam passing through the optical axis is delayed more than the beat note of the beam passing through the edge of the lens, thus the rays through the optical axis are virtually reflected from farther away than rays passing through the edges of the lens. By closing an iris around the lens, the virtual distance (time delay) would appear to increase due to the attenuation of the faster, or leading, rays while maintaining the slower, or lagging, rays. At longer distance, the divergence of the beam could result in non-linearity of the phase as a function of distance.

The size of the retroreflector can have an effect on the apparent distance. For example, a retroreflector will return a beam reflected about the centerline. If the retroreflector is in the center of an inhomogeneous beat note wavefront, the phase at the center is not the same as the edges. If a measurement is taken, and the retroreflector is then replaced by a larger retroreflector, additional power of yet another phase is integrated at the detector, thus the distance will appear to have changed—even if the two retroreflectors are centered on the same coordinate. Contamination of the reflecting surfaces of a retroreflector can attenuate parts of the beam, which can change the phase integrated at the detector.

In the '670 EDM instrument, the outgoing beam was reflected off a small 45° mirror mounted on the outside surface of the objective lens. Thus the outgoing beam did not pass through the lens, and while there was beat note aberrations due to the beam shaping optics on the laser diode, there was no beat note aberration introduced to the outgoing beam by the objective.

In most commercial EDM instruments, the outgoing beam shares at least a portion of the optical train with the receiving optics train. It should be pointed out that the principle of reversibility does not hold between the outgoing beam and the return beam, i.e., the beat note aberrations do not cancel for a reflected signal.

Returning to FIG. 6, if the phase of the outgoing beat note 66 on the optical axis lags the phase for the beam near the edge of the objective; on reflection by mirror 67, the return beam 68 will be a mirror reflection of 66 and also lag on the optical axis, where it will undergo additional lag through the optical train, thus increasing the aberration at the focal point 55. Thus if a beam splitter is used in front of the focal point 55 and a detector is placed in the split path, the distortion would be double the distortion of the outgoing beat note 66. It is clear that the optical designer must also consider both paths for optics that share parts of the optical train. Of course, if the optics train produces a flat beat note wavefront, and the return optics is symmetrical, the beat note aberration will be corrected.

The example given above shows that the magnitude of the effect can be of the order of a delay corresponding to a percent of the wavelength of the modulation signal. For modern EDM instruments that strive to achieve phase measurements of the order of a part in $10^5$ of the modulation frequency and error budgets in the order of a few microns, this is a significant source of error. Unlike some random sources of error, the beat note aberration can be minimized by a properly designed optical system.

Henceforth the general undesirable effects of dispersion of a beat note will be referred to as Optical Amplitude Modulation (OAM) aberration in order to distinguish the effects from time-invariant aberrations.

6.6 Wavefront Through a Flat Plate in a Converging Beam

Figure 7:
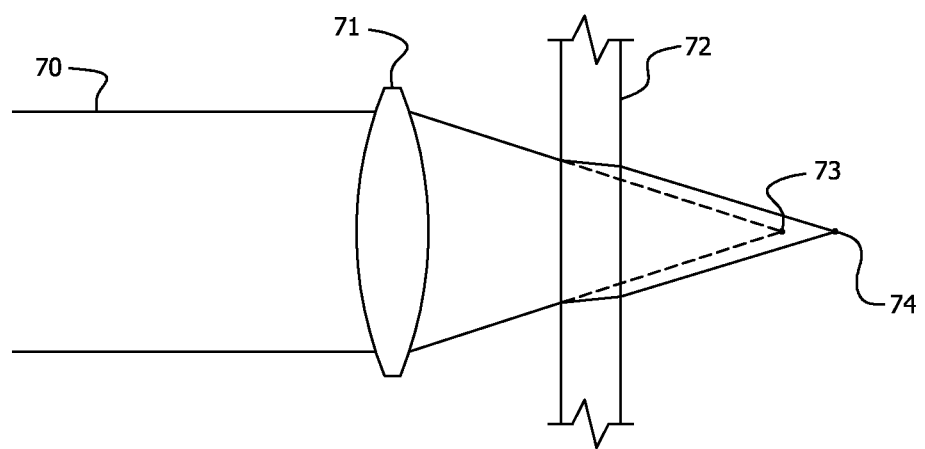
FIG. 7 is a diagram illustrating the effect of a window in a converging beam.

As shown hereinabove, a flat plate in a parallel beam produces a constant beat note phase delay homogeneously across the parallel beam. It is well known in the art that a flat plate, a cube beamsplitter, or the like, in a converging beam, produces an offset in the focal point of the converging beam. This is illustrated in FIG. 7 where rays 70 passing through converging lens 71 would converge to focal point 73. By adding flat window 72 in the converging beam, the rays 70 are bent according to Snell's law on entering and exiting window 72. The net result is that the beams 70 converge to a shifted focal point 74. This is explained in detail in Chapter 7 of *Modern Optical Engineering*, Warren J. Smith [19], the disclosure of which is incorporated by reference herein. Section 7.8 states on page 134;

When used in parallel light, a plane parallel plate is completely free of aberrations (since the rays enter and leave at the same angles). However, if the plate is inserted in a convergent or divergent beam, it does introduce aberrations. The longitudinal image displacement $(n-1)t/n$ is greater for short wavelength light (higher index) than for long, so that overcorrected chromatic aberration is introduced. The amount of displacement is also greater for rays making large angles with the axis; this is, of course, overcorrected spherical aberration.

Smith continues to give the equations for various aberrations which will not be reproduced herein. As shown by Smith, a flat plate 72 in a converging beam produces spherical aberration. As will be shown hereinbelow, this can be designed to correct for spherical aberration of a lens 71. If the plate is tilted, it can also produce other aberrations. As shown in FIG. 7, the converging rays at angles travel farther through the plate than rays parallel to the optical axis. Thus a flat plate, cube beamsplitter, or the like, in a converging beam also produces OAM aberration, due to the variable path lengths through the glass for the variable angles.

6.7 Methods for Correcting Optical Amplitude Modulation Aberration

Having thus identified and explained the subtle but significant source of error in OAM systems, methods will be given to minimize the impact on an instrument.

6.7.1 Reflective Optics

One solution is to use only reflective optics, which do not exhibit dispersion. It would be practical in a number of EDM instrument designs to simply adopt optical designs using reflective optics for the collimating optics, i.e., architectures similar to optical and radio telescopes, radar systems, microwave systems, or the like.

Figure 8:
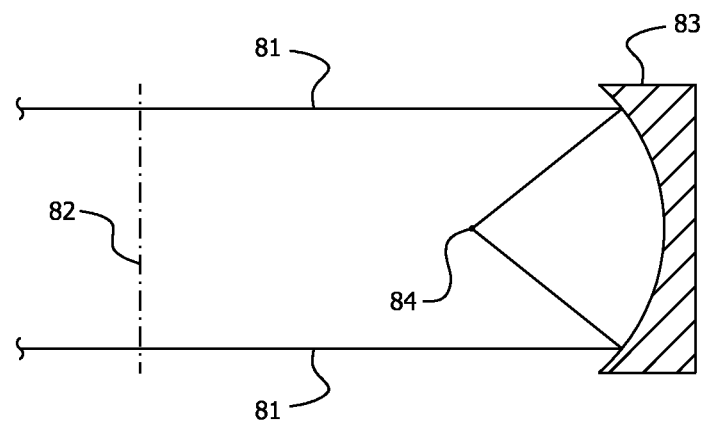
FIG. 8 is a diagram illustrating reflective optics.

For example, as shown in FIG. 8, a plane wave 82 comprising a flat carrier, flat upper sideband, and flat lower sideband traveling in a ray 81 would be reflected by a parabolic reflector 83 to a focal point 84. Since the reflector 83 does not exhibit dispersion, rays 81 of all wavelengths would be in phase at the focal point 84. It will be recognized from the principle of reversibility that the same would be true for a source at the focal point 84.

6.7.2 Match Carrier to Minimal Dispersion Regions of the Optical Material

Another solution would be to find materials and operating wavelength combinations with minimal dispersion. U.S. Pat. No. 7,268,880 ('880) to Hinderling, the disclosure of which is incorporated by reference herein, teaches exploiting molecular resonances to increase the effect of dispersion for a two carrier EDM system. FIG. 3 of '880 shower resonances in the index of refraction of atmospheric gas, due to $O_2$, with local maxima and minima in the neighborhood of 760 nm.

Figure 9:
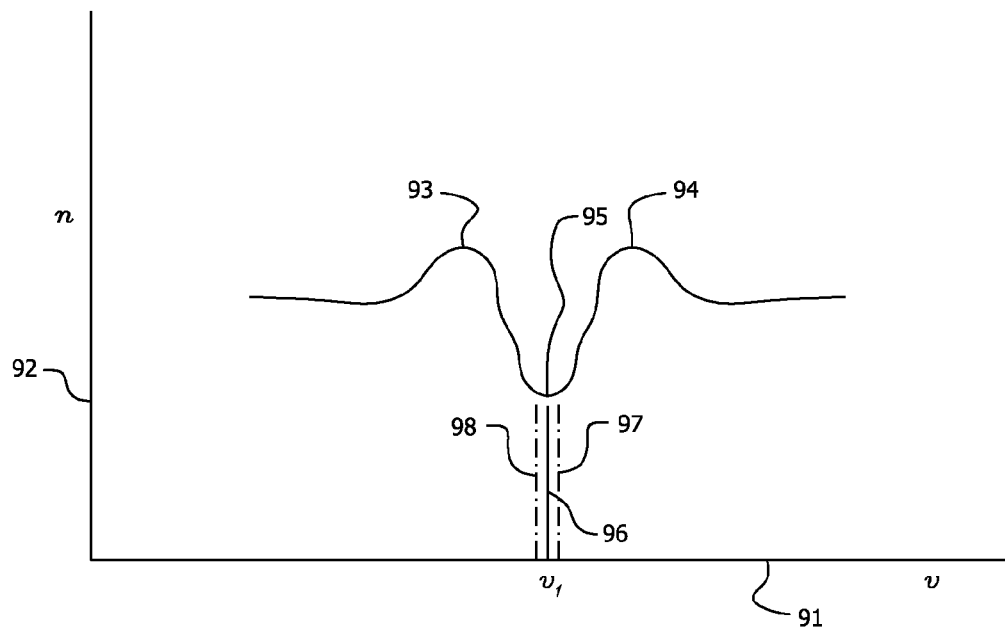
FIG. 9 is a diagram illustrating matching the sidebands to a resonance in the index of refraction.

As shown in FIG. 9, for n 92 plotted against ν 91, if the carrier frequency 96 is matched to a local maxima 93, 94 or minima 95 for an optical material, or if the material could be custom designed to match the carrier frequency, dn/dν=0, at the carrier frequency, i.e., there is no dispersion for the sidebands 97, 98, i.e., n is the same for the sidebands 97, 98.

6.7.3 Computer Modeling Tools

Smith [19] describes the synthesis of optical system design in Chapter 16. He describes one process as an optimization process where the change in aberration $\Delta A_n$ is described in his Eq. 16.15

$$\Delta A_n = \sum_{i=1}^{i=k} \left( \frac{\delta A_n}{\delta C} \right)_i \Delta C_i \tag{76}$$

where $\Delta C_i$ is the change in parameter $C_i$ required to produce a change and $(\delta A_n/\delta C)_i$ is the partial of the aberration $A_n$ with respect to $C_i$.

In section 16.8, the disclosure of which is incorporated by reference herein, Smith describes the process.

The computer is presented with an initial prescription and a set of desired values for a limited set of aberrations. The program then computes the partial differentials of the aberrations with respect to each parameter (curvature, spacing, etc.) which is to be adjusted, and establishes a set of simultaneous equations (Eq. 16.15), which it then solves for the necessary changes in the parameters. Since this linear solution is an approximate one, the computer then applies these changes to the prescription (assuming that the solution is an improvement) and continues to repeat the process until the aberrations are at the desired values. When there are more variable parameters than system characteristics to be controlled, there is no unique solution to the simultaneous equations; in this case, the computer will add another requirement, namely that the sum of the squares of the (suitably weighted) parameters changes be a minimum.

As described in the background hereinabove, computer modeling tools such as ZEMAX, CODE-V, Optica 3, U.S. Pat. No. 7,469,202, US 2009/0143874 and others are well known in the art to perform time-invariant processes like this.

Figure 10:
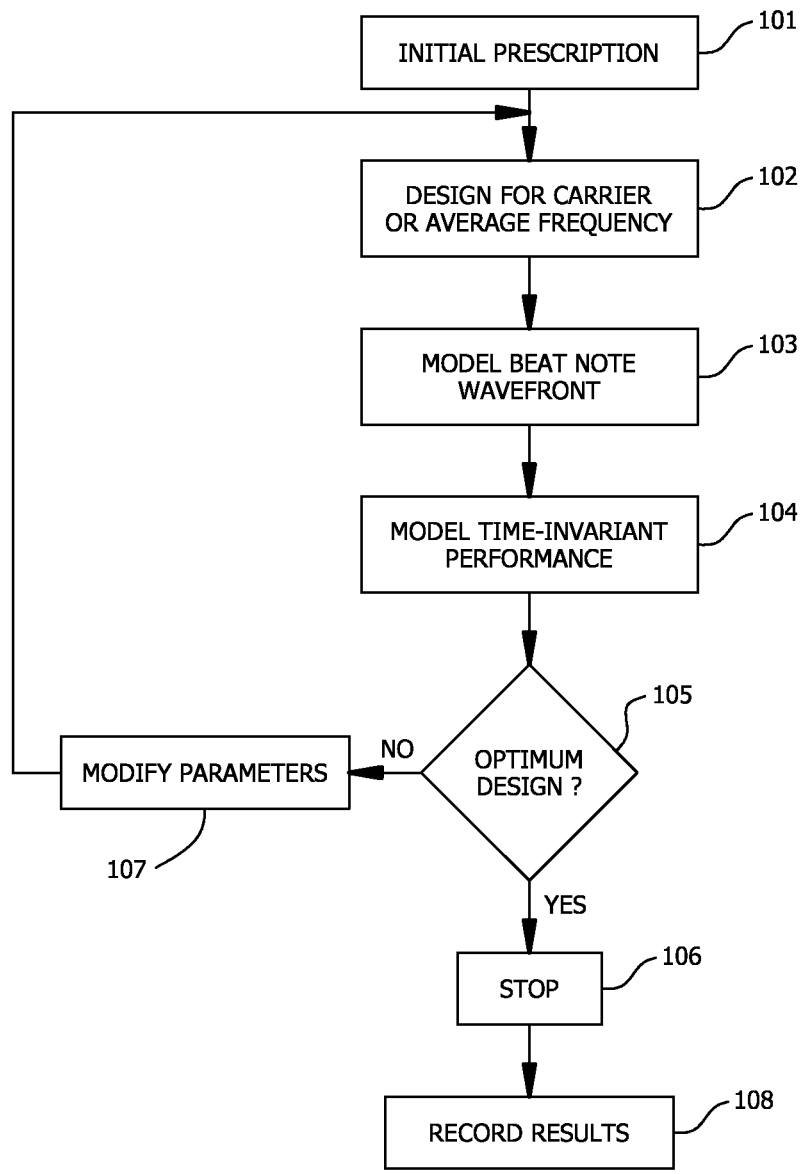
FIG. 10 is a block diagram of a method for designing an OAM optical system.

However, there are no known products that include corrections for OAM aberrations. They would need to be modified slightly to include a $\Delta A_n$ term for OAM aberration. One possible method is shown in FIG. 10. The initial prescription 101 for the optical system would need to be defined. This would include such things as focal length, beam size, aperture size, wavelength, etc. The optical system could be designed using conventional design techniques for the carrier frequency, or average frequency of a band 102. The conventional design could then be enhanced by including modeling of the beat note 103. The design could also be modeled for the conventional time-invariant parameters 104. The combination of models 103, 104 could then be evaluated for optimization 105. If the design meets the criteria for time-invariant 104 and beat note 103 constraints, the process is complete 106, If not, parameters are modified 107, and the process is repeated until the process is complete 106 and the results are recorded 108.

For example; for an EDM system, in addition to the time-invariant requirement for focusing the power to a point on the detector, the software could also add a term for a requirement such as $$\Phi = \frac{\int_A \rho \phi \, da}{\int_A \rho \, da} \tag{77}$$

where $\Phi$ is the integrated phase of the signal at the detector weighted by the power; $\rho$ is the optical power density, and $\phi$ is the phase of the beat note wavefront over area da, and A is the area of the aperture. It will be recognized by those skilled in the art that other requirements may be made for various design constraints.

The ideal condition would be for $\phi$ to be invariant over any area da of the beam, i.e., for $\phi$ to be flat over the entire beam. This would be relatively simple for a reflective optics system, but possibly not practical in a dioptic system.

A possible design criterian could include the condition that $$d\Phi/da < \in \tag{78}$$

where $\in$ is an acceptable OAM aberration. Another possible design criterion would be to assume a beam profile for ρ, such as a Gaussian with a specified full width at half maximum, or a flat profile. The standard deviation σ of φ for uniformally sampled regions over the area A of the lens, for selected carrier frequencies and modulation frequencies, would be a number that could be specified for a standard catalog item lens that would be helpful to a designer. For example, knowing the σ for common laser carrier frequencies and various modulation frequencies for a stock lens would be very useful in the design of an optical system.

Other methods for correcting OAM aberrations described hereinbelow would depend on computer modeling tools equipped to model OAM and beat note wavefront analysis.

6.7.4 Achromatic Lenses

Yet another solution would be to compensate the optics by using plural materials with different dispersions. For example, it is well know in the art to use doublet, triplet, or multiple element lenses made of plural materials to correct for chromatic aberrations, i.e., achromatic lenses. This is explained in chapter 9 of Jenkins and White [3], the disclosure of which is incorporated by reference herein. However, when people think of achromatic lenses they are usually thinking about lenses designed for colors such as red and blue. As shown hereinabove the frequency at the C red line is $v_C$=456 810.9 GHz, and the frequency at the F blue line is $v_F$=616 688.5 GHz, or $v_F - v_C$=159 877.6 GHz. This is a bandwidth of the order of $10^5$ times greater than typical modulation frequencies for EDM.

However, the same principles that are used to design an achromat over $v_F - v_C$=159 877.6 GHz, as illustrated in an example on pages 181 and 182 of Jenkins and White, can be employed to design an achromat for much narrower bandwidths, such as 1.5 GHz. An achromat lens designed for the upper and lower sidebands of a OAM carrier will produce a flat beat note wavefront.

For example, turning to FIG. 6. If the lens 51 was designed to be achromatic for the sidebands 64, 65, the sidebands 64, 65 and the beat note 66 would all be flat, and there would be no OAM aberration.

U.S. Pat. No. 6,665,116 and U.S. Pat. No. 7,088,503 to Harvey et al., the disclosure of both of which are incorporated by reference herein, teach an achromatic lens for millimeter-wave and infrared bands using a similar technique. However there is no suggestion of using the technique to optimize the phase of a beat note produced by the two wavelengths.

It is also well know in the art that another method for correcting chromatic aberration, is to use two thin lenses made of the same material and separated by a distance equal to half the sum of their focal lengths, as described in section 9.14 "Separated Doublet" of Jenkins and White [3], the disclosure of which is incorporated by reference herein.

6.7.5 Flat Plate in a Converging Beam

Still another solution would be to use a flat plate in a converging beam. As shown hereinabove and in FIG. 7, a window in a converging beam can be used to correct spherical aberration. The same technique can be used to correct for OAM aberrations. In FIG. 7, a beam 70 through the outer edge of lens 71 passes through less glass than a beam through the optical axis. However, the outer beam 70 passes through more glass in the window 72, which could be used to compensate for the OAM aberration of the lens 71. It will be recognized that lens 71 could be a plano-convex lens and the window 72 could be cemented to the lens 71 to construct an assembly and minimize reflections.

In fact, a number of EDMs use cube beamsplitters in a converging beam to split the return beam to the detector. For example: U.S. Pat. No. 5,440,112 to Sakimura et al.; U.S. Pat. No. 6,333,783 to Ohishi; U.S. Pat. No. 7,081,917 to Shimoyama et al.; U.S. Pat. No. 7,443,495 to Hertzman et al.; U.S. Pat. No. 7,626,690 to Kumagai et al.; and many others use beamsplitters in the optical train which potentially compensate for OAM aberrations produced by other optical elements, such as lenses. However, there are no known suggestions that these beam splitters were incorporated to intentionally correct OAM aberrations.

6.7.6 Kellner-Schmidt Corrector Plate

Yet another solution is to use a corrector plate. Jenkins and White [3] describes the Kellner-Schmidt optical system in section 10.20, the disclosure of which is incorporated by reference herein. Born and Wolf [4] also describes the use of corrector plates in section 6.4, the disclosure of which is incorporated by reference herein. U.S. Pat. No. 969,785 to Kellner uses a corrector plate to correct the spherical aberration of a spherical mirror. In some optical designs, a similar corrector plate may be used to correct OAM aberration. In some designs, a Fresnel lens could also be used as a corrector plate, or as the main lens.

6.8 Engineering Data

In addition to modeling components and systems as described hereinabove, and providing engineering data related to OAM parameters, such as wavefront distortion of the beat note at specified carrier frequencies, the standard deviation of the phase of the beat note for ideal flat wavefronts, and the like; experimental measurements could be used to confirm a model.

As explained hereinabove, a simple experiment is to open and close an iris to block portions of the beam while monitoring the phase at the detector. One problem with this method is that it is hard to identify if the problem is the optical system or the illumination beam, i.e., wavefront distortions in the beam.

Figure 11A:
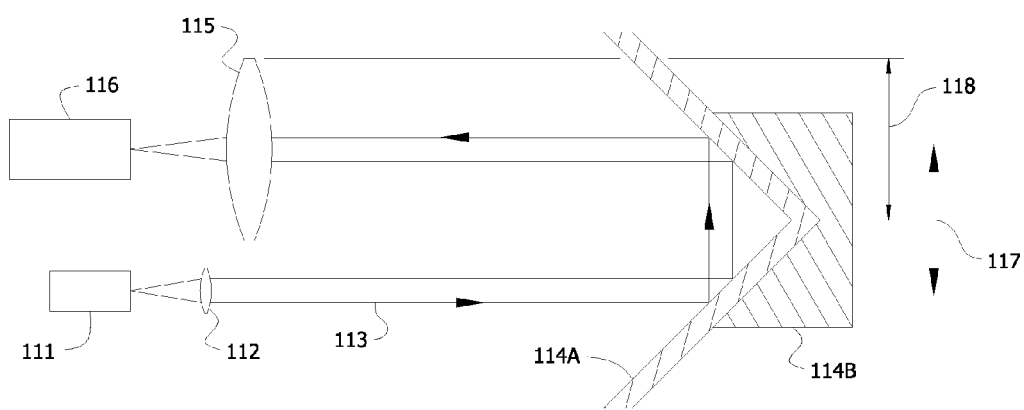
FIGS. 11A and 11B illustrates a method for measuring wavefront distortion.

In principle, a narrow collimated modulated source could be used to map the phase on a detector. However, due to the high precision required, movement of the source and/or detector is a potential problem. Simply moving an electrical cable can introduce phase changes of a part in $10^{-5}$. FIG. 11A shows one method for mapping the phase over a lens. Modulated laser 111 is collimated by lens 112 to produce a narrow beam 113. The beam 113 is reflected by a retroreflector mirror 114A mounted in a base 114B and directed to the lens under test 115. The beam 113 is focused by the lens 115 on a detector 116. The laser is modulated and the detector signal is processed by EDM electronics which are not shown.

Figure 11B:
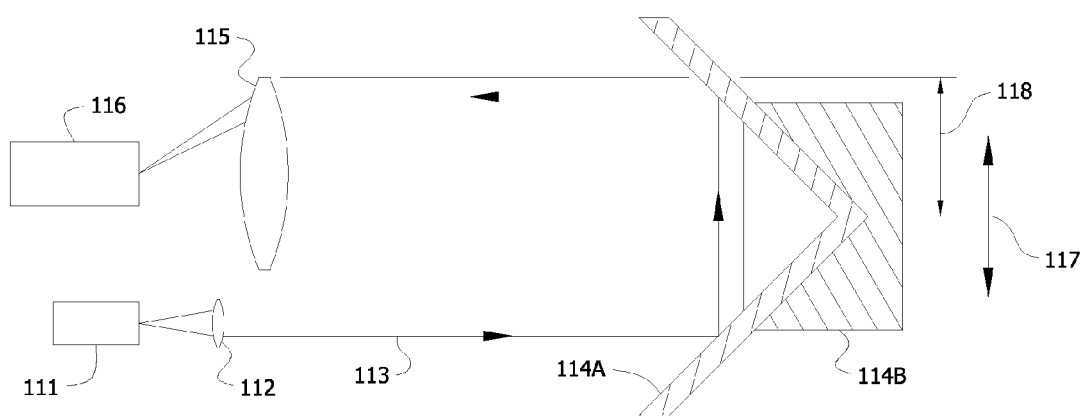

It is well known in the art that a retroreflector has the property of reflecting an incident beam into a reflected beam that is parallel to the incident beam, and offset symmetrically to the vertex of the retroreflector. The retroreflector mirror 114A mounted in base 114B is shown as configured to be translated normal to the beam 113 along axis 117 by a distance 118. In FIG. 11A, the beam 113 is shown incident on the center of the lens 115. In FIG. 11B, the beam 113 is shown incident on the edge of the lens 115.

Thus the phase of the detected signal at the detector 116 can be mapped as a function of the displacement 118 without moving the laser 111 or the detector 116, and using the same beam. While the displacement 117 is shown in one dimension, it will be understood that the retroreflector 114 can also be moved in the orthogonal direction to map the lens in the (x,y) plane.

A simple field test that can be used to evaluate an instrument, such as a total station, is to map the measured distance for a region around the center of a retroreflector. In one simple case, a total station can be centered on a retroreflector target. The measured distance would then be compared to measured distances for cases where the instrument is moved off center. In the ideal case, the distance should not change until the power drops significantly. With modern tracking total stations, the test could be automated to map in a boustrophedon (as the ox plows) pattern and report the statistics or plot the distance map. While this test would not be sufficient to diagnose the cause of a problem, it would be sufficient to show that there is no problem. It could be used as a simple test to compare instruments produced by different vendors, or incorporated into standards and specifications.

While various embodiments of the invention have been described in examples related to electronic distance measurement, it will be understood by those skilled in the art that various other embodiments may use the teachings herein to advantage in other fields without departing from the spirit and scope of the invention.

REFERENCES

[1] Herbert Taub and Donald L. Schilling. *Principles of Communication Systems*. McGraw Hill, 1971.
[2] Paul Horowitz and Winfield Hill. *The Art of Electronics*. Cambridge University Press, second edition, 1989.
[3] Francis A. Jenkins and Harvey E. White. *Fundamentals of Optics*. McGraw-Hill, fourth edition, 1976.
[4] Max Born and Emil Wolf. *Principles of Optics*. Cambridge University Press, seventh edition, 2002.
[5] Daniel Malacara, editor. *Optical Shop Testing*. Wiley, 1978.
[6] Melles Griot. *Melles Griot Catalog X*, 2005.
[7] Leo Levi. *Applied Optics*, volume 1. Wiley, 1968.
[8] Joseph W. Goodman. *Introduction to Fourier Optics*. Roberts & Company, third edition, 2005.
[9] Jack D. Gaskill. *Linear Systems, Fourier Transforms, and Optics*. Wiley, 1978.
[10] Ronald N. Bracewell. *The Fourier Transform and its Applications*. McGraw-Hill Book Company, second edition, 1978.
[11] M. E. Van Valkenburg. *Network Analysis*. Prentice-Hall, second edition, 1964.
[12] Athanasios Papoulis. *Systems and Transforms with Applications in Optics*. McGraw-Hill, 1968.
[13] C. D. Burnside. *Electronic Distance Measurement*. BSP Professional Books, third edition, 1991.
[14] Thierry Bosch and Marc Lescure. *Selected Papers on Laser Distance Measurements*, volume MS 115 of *SPIE Milestone Series*. SPIE Optical Engineering Press, 1995.
[15] J. M. Rueger. *Electronic Distance Measurement*. Springer-Verlag, third edition, 1990.
[16] A. Richard Thompson, James M. Moran, and George W. Swenson, Jr. *Interferometry and Synthesis in Radio Astronomy*. Wiley, second edition, 2001.
[17] Schott North America, Inc. *TIE-29: Refractive Index and Dispersion*, 2007.
[18] Schott North America, Inc. *N-BK7 Data Sheet*, 2007.

[19] Warren J. Smith. *Modern Optical Engineering*. McGraw Hill, fourth edition, 2008.

What is claimed is:

1. A method for modeling properties of an optical system subject to optical amplitude modulated signals, wherein the method comprises steps of:
    selecting an optical frequency;
    selecting an upper sideband frequency and a lower sideband frequency;
    executing instructions by a computer that;
        model a time-invariant component of the properties of the optical system based at least in part on the optical frequency;
        model a temporal component of the properties of the optical system based at least in part on a wavefront of a beat note having a beat note frequency produced by the upper sideband and the lower sideband; and
        record at least one property of the model of the temporal component of the optical system;
    wherein the beat note frequency is greater than $10^{-7} \times \{$the optical frequency$\}$, and less than $10^{-2} \times \{$the optical frequency$\}$.

2. The method of claim 1 wherein:
    $10^{-7} \times \{$the optical frequency$\}$ is 50 MHz, and $10^{-2} \times \{$the optical frequency$\}$ is 5 THz.

3. The method of claim 1 wherein:
    a property of the model of the temporal component of the optical system is a standard deviation of a phase of the beat note.

4. The method of claim 1 wherein:
    a property of the model of the temporal component of the optical system is a wavefront distortion of the beat note.

5. The method of claim 1 wherein:
    a property of the model of the temporal component of the optical system is provided as engineering data for a product offered to sell.

6. A method for modeling propagation of electromagnetic radiation through an optical system with steps comprising:
    executing instructions by a computer that;
        model the electromagnetic radiation to have a first wavefront of a carrier wave at a carrier frequency, a second wavefront of an upper sideband of the carrier wave at an upper sideband frequency, a third wavefront of a lower sideband of the carrier wave at a lower sideband frequency, and a fourth wavefront at a beat note frequency;
        model the fourth wavefront to be produced by interference between the upper sideband of the carrier wave and the lower sideband of the carrier wave, wherein the upper sideband of the carrier wave, the lower sideband of the carrier wave, and the beat note frequency, are generated by optical amplitude modulation of the carrier wave at a modulation frequency;
        model the optical system to have at least one optical element having at least one refractive material having a first index of refraction at the carrier frequency, a second index of refraction at the upper sideband frequency, and a third index of refraction at the lower sideband frequency;
        model parameters of a plurality of rays of the electromagnetic radiation propagating through the optical system;
        model a path of the carrier wave for each of the plurality of rays, based at least in part on the first index of refraction; and
        model a phase of the modulation frequency of the fourth wavefront for each of the plurality of rays, based at least in part on the second index of refraction and the third index of refraction.

7. A non-transitory computer-readable storage media, wherein instructions stored on the media, when executed by a computer, model propagation of electromagnetic radiation through an optical system, the instructions comprising:
    modeling the electromagnetic radiation to have a first wavefront of a carrier wave at a carrier frequency, a second wavefront of an upper sideband of the carrier wave at an upper sideband frequency, a third wavefront of a lower sideband of the carrier wave at a lower sideband frequency, and a fourth wavefront at a beat note frequency;
    modeling the fourth wavefront to be produced by interference between the upper sideband of the carrier wave and the lower sideband of the carrier wave, wherein the upper sideband of the carrier wave, the lower sideband of the carrier wave, and the beat note frequency, are generated by optical amplitude modulation of the carrier wave at a modulation frequency;
    modeling the optical system to have at least one optical element having at least one refractive material having a first index of refraction at the carrier frequency, a second index of refraction at the upper sideband frequency, and a third index of refraction at the lower sideband frequency;
    modeling parameters of a plurality of rays of the electromagnetic radiation propagating through the optical system;
    modeling a path of the carrier wave for each of the plurality of rays, based at least in part on the first index of refraction; and
    modeling a phase of the modulation frequency of the fourth wavefront for each of the plurality of rays, based at least in part on the second index of refraction and the third index of refraction.

* * * * *